United States Patent
Johar et al.

(10) Patent No.: US 9,912,777 B2
(45) Date of Patent: Mar. 6, 2018

(54) SYSTEM, METHOD, AND LOGIC FOR GENERATING GRAPHICAL IDENTIFIERS

(71) Applicant: CISCO TECHNOLOGY, INC., San Jose, CA (US)

(72) Inventors: Sahiba Singh Johar, Cupertino, CA (US); Susan McGarry, San Francisco, CA (US); Jeremy Santy, Avila Beach, CA (US); Lonny Chu, Walnut Creek, CA (US)

(73) Assignee: Cisco Technology, Inc., San Jose, CA (US)

( * ) Notice: Subject to any disclaimer, the term of this patent is extended or adjusted under 35 U.S.C. 154(b) by 318 days.

(21) Appl. No.: 14/643,902

(22) Filed: Mar. 10, 2015

(65) Prior Publication Data

US 2016/0269504 A1    Sep. 15, 2016

(51) Int. Cl.
| | |
|---|---|
| *H04L 29/08* | (2006.01) |
| *H04L 12/24* | (2006.01) |
| *H04L 29/06* | (2006.01) |
| *G06F 3/048* | (2013.01) |

(52) U.S. Cl.
CPC ............ *H04L 67/306* (2013.01); *G06F 3/048* (2013.01); *H04L 41/22* (2013.01); *H04L 65/403* (2013.01); *H04L 67/141* (2013.01); *H04L 67/38* (2013.01)

(58) Field of Classification Search
CPC ..... H04L 67/306; H04L 41/22; H04L 65/403; H04L 67/141; H04L 67/38; G06F 3/048
USPC ....................................................... 709/227
See application file for complete search history.

(56) References Cited

U.S. PATENT DOCUMENTS

| | | | | |
|---|---|---|---|---|
| 8,717,401 | B1 * | 5/2014 | Gossweiler, III | ...... H04N 7/147 348/14.01 |
| 8,832,570 | B1 * | 9/2014 | Marra | .................... G06Q 50/01 345/619 |
| 8,832,789 | B1 * | 9/2014 | Gossweiler, III | ... H04W 64/003 455/411 |

(Continued)

OTHER PUBLICATIONS

PCT Jun. 16, 2016 International Search Report and Written Opinion from International Application Serial No. PCT/US2016/021552; 12 pages.

(Continued)

*Primary Examiner* — Nicholas Taylor
*Assistant Examiner* — Chong G Kim

(57) ABSTRACT

An example method is provided and includes establishing, by one or more servers, a communication session that provides an endpoint with access to at least one communication data stream, wherein the at least one communication data stream involves a plurality of profiles; generating a plurality of graphical identifiers corresponding to the plurality of profiles, wherein each of the plurality of graphical identifiers has at least one visual effect that is based on a determination of whether the corresponding endpoint is presently connected to the another communication session with the one or more servers, and wherein each of the plurality of graphical identifiers has at least one additional visual effect that is based on an elapsed time since the corresponding endpoint performed the action related to the another communication session; and transmitting the plurality of graphical identifiers to the corresponding endpoint of at least one of the plurality of profiles.

18 Claims, 17 Drawing Sheets

(56) References Cited

U.S. PATENT DOCUMENTS

| | | | |
|---|---|---|---|
| 2005/0066070 A1* | 3/2005 | Klassen | G06F 15/02 |
| | | | 710/1 |
| 2006/0098085 A1 | 5/2006 | Nichols et al. | |
| 2006/0128404 A1* | 6/2006 | Klassen | H04L 12/586 |
| | | | 455/466 |
| 2008/0098067 A1 | 4/2008 | O'Sullivan et al. | |
| 2009/0058984 A1* | 3/2009 | Lee | H04N 7/15 |
| | | | 348/14.02 |
| 2009/0086012 A1* | 4/2009 | Thapa | H04N 7/15 |
| | | | 348/14.08 |
| 2009/0089683 A1* | 4/2009 | Thapa | H04N 7/15 |
| | | | 715/756 |
| 2009/0177981 A1* | 7/2009 | Christie | G06F 3/04883 |
| | | | 715/758 |
| 2009/0181659 A1 | 7/2009 | Lim et al. | |
| 2010/0153497 A1* | 6/2010 | Sylvain | H04N 7/15 |
| | | | 709/204 |
| 2012/0131578 A1 | 5/2012 | Maor et al. | |
| 2012/0150973 A1* | 6/2012 | Barak | G06Q 30/0609 |
| | | | 709/206 |
| 2013/0073990 A1* | 3/2013 | Park | G06Q 50/01 |
| | | | 715/758 |
| 2013/0205408 A1* | 8/2013 | Yerli | H04L 63/10 |
| | | | 726/28 |
| 2013/0212202 A1* | 8/2013 | Lee | G06Q 10/107 |
| | | | 709/206 |
| 2013/0305164 A1* | 11/2013 | Karunamuni | G06Q 10/107 |
| | | | 715/752 |
| 2014/0038624 A1* | 2/2014 | Mun | H04W 76/04 |
| | | | 455/450 |
| 2014/0115068 A1* | 4/2014 | Kurupacheril | H04L 12/1813 |
| | | | 709/206 |
| 2014/0218461 A1* | 8/2014 | DeLand | H04L 12/1813 |
| | | | 348/14.07 |
| 2014/0222429 A1* | 8/2014 | DeLand | H04L 12/1813 |
| | | | 704/251 |
| 2014/0310352 A1 | 10/2014 | Bhan et al. | |
| 2015/0006177 A1* | 1/2015 | DeLand | H04L 12/1813 |
| | | | 704/251 |
| 2015/0022625 A1* | 1/2015 | Thapa | H04N 7/15 |
| | | | 348/14.08 |
| 2015/0256570 A1* | 9/2015 | Joon | H04M 1/2535 |
| | | | 370/261 |
| 2015/0332219 A1 | 11/2015 | Putterman et al. | |
| 2016/0099984 A1* | 4/2016 | Karagiannis | H04L 51/046 |
| | | | 709/206 |

OTHER PUBLICATIONS

Adams, L., et al., "Distributed Research Teams: Meeting Asynchronously in Virtual Space," System Sciences, Proceedings of the 32$^{nd}$ Annual Hawai I International Conference on Maui, Hawaii USA, Jan. 5, 1999; 10 pages.

Barksdale, Jeremy, et al., "Video Threads: Asynchronous Video Sharing for Temporally Distributed Teams," Proceedinsg of the ACM 2012 Conference on Computer Supported Cooperative Works, CSCW 12, Feb. 11, 2012, New York, NY; 4 pages.

Skype and/or Microsoft, "How can I manage a group video call (Skype for modern Windows)?" © 2015, 8 pages; https://support.skype.com/en/faq/FA34481/how-can-i-manage-a-group-video-call-skype-for-modern-windows.

* cited by examiner

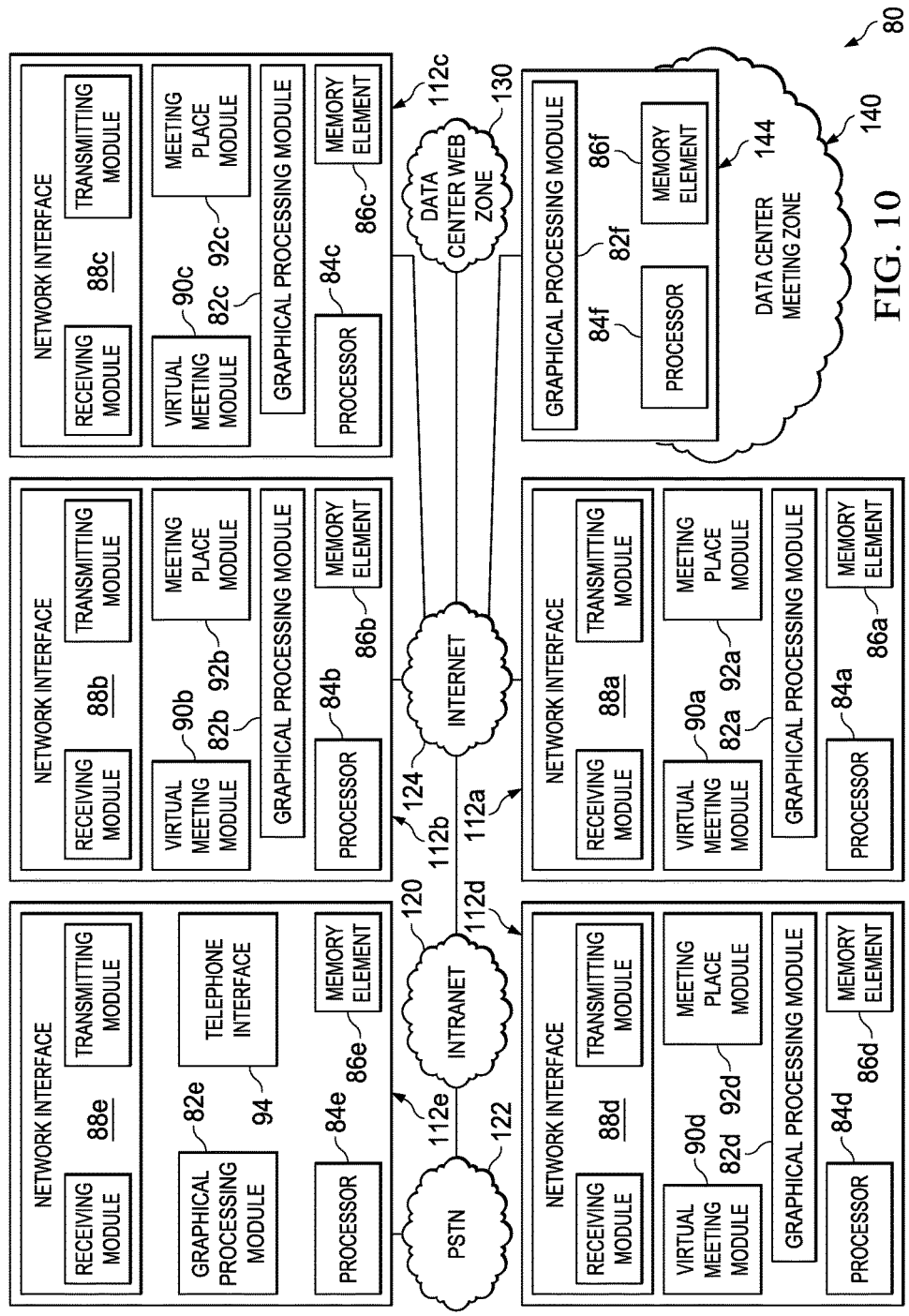

US 9,912,777 B2

SYSTEM, METHOD, AND LOGIC FOR GENERATING GRAPHICAL IDENTIFIERS

TECHNICAL FIELD

The present disclosure relates generally to network systems and, more particularly, to generating graphical identifiers associated with participant in virtual collaborative environments.

BACKGROUND

Modern electronic communications enable various devices to communicate with one another virtually. Many users utilize the devices to facilitate virtual collaborative environments. In such collaborative environments, each user may be associated with a different graphical identifier. Intelligently managing such graphical identifiers can provide many benefits to the users of the collaborative environments.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 10 is a simplified schematic diagram illustrating possible details related to an example infrastructure of the communication system in accordance with one embodiment.

DESCRIPTION OF EXAMPLE EMBODIMENTS OF THE DISCLOSURE

Overview

Figure 1:
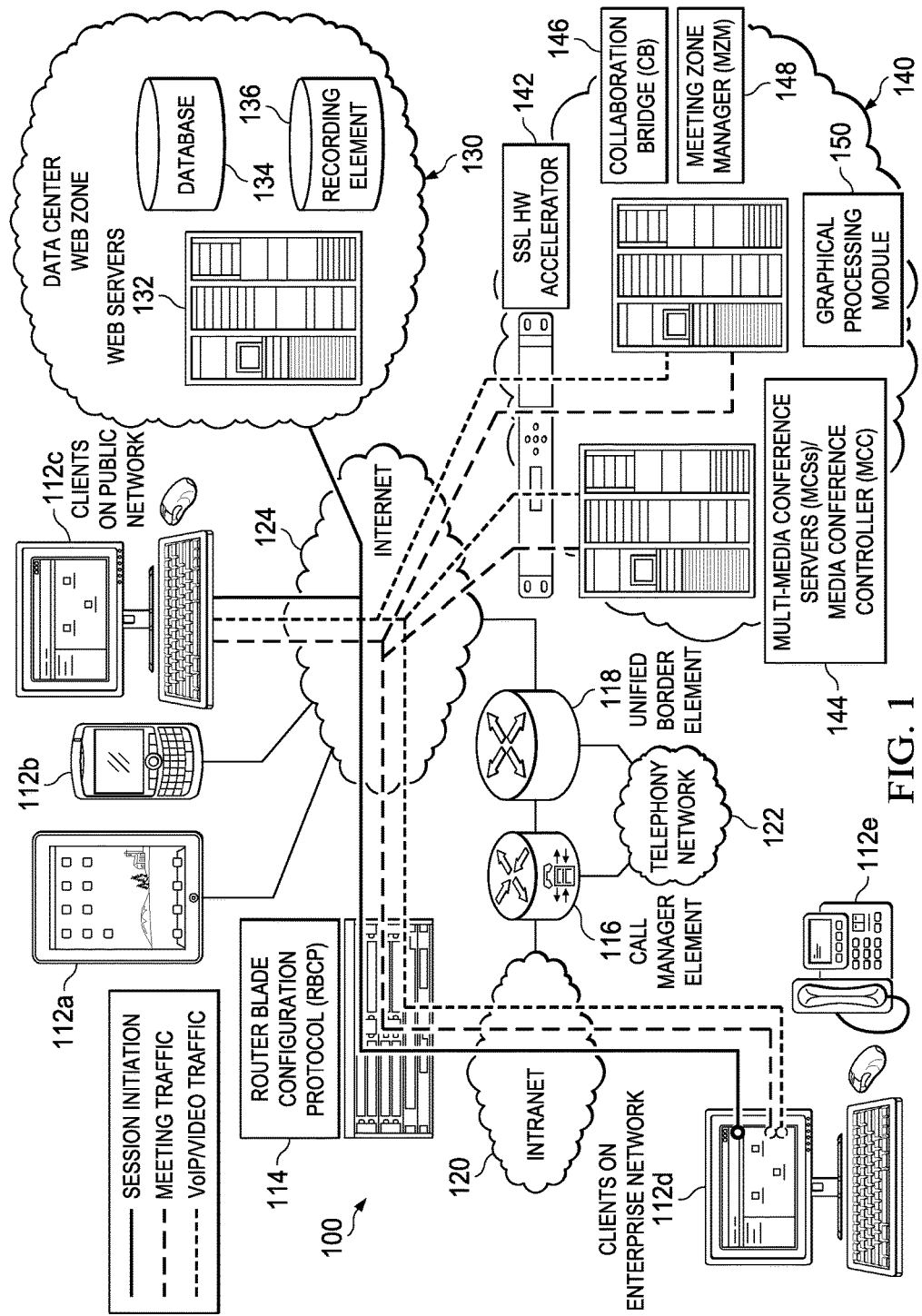
FIG. 1 is a simplified schematic diagram of a communication system for managing identifiers in accordance with some embodiments of the present disclosure.

In some examples, a method comprises establishing, by one or more servers, a communication session that provides an endpoint with access to at least one communication data stream. The at least one communication data stream can involves a plurality of profiles. The method may further comprise generating a plurality of graphical identifiers corresponding to the plurality of profiles. Each of the plurality of graphical identifiers may have at least one visual effect that is based on a determination of whether the corresponding endpoint is presently connected to another communication session with the one or more servers. Moreover, each of the plurality of graphical identifiers may have at least one additional visual effect that is based on an elapsed time since the corresponding endpoint performed the action related to the another communication session. The method can further comprise transmitting the plurality of graphical identifiers to the corresponding endpoint of at least one of the plurality of profiles.

In further examples, a server comprises a memory element storing electronic code; and a graphical processing module coupled to the memory element and operable to execute the electronic code, wherein the graphical processing module, when executing the electronic code, performs operations comprising: establishing a communication session that provides an endpoint with access to at least one communication data stream. The at least one communication data stream can involves a plurality of profiles. The method may further comprise generating a plurality of graphical identifiers corresponding to the plurality of profiles. Each of the plurality of graphical identifiers may have at least one visual effect that is based on a determination of whether the corresponding endpoint is presently connected to another communication session with the server. Moreover, each of the plurality of graphical identifiers may have at least one additional visual effect that is based on an elapsed time since the corresponding endpoint performed the action related to the another communication session. The method can further comprise transmitting the plurality of graphical identifiers to the corresponding endpoint of at least one of the plurality of profiles.

In still further examples, one or more non-transitory media that includes code for execution and when executed by one or more processors performs operations comprising establishing, by one or more servers, a communication session that provides an endpoint with access to at least one communication data stream. The at least one communication data stream can involves a plurality of profiles. The method may further comprise generating a plurality of graphical identifiers corresponding to the plurality of profiles. Each of the plurality of graphical identifiers may have at least one visual effect that is based on a determination of whether the corresponding endpoint is presently connected to another communication session with the one or more servers. Moreover, each of the plurality of graphical identifiers may have at least one additional visual effect that is based on an elapsed time since the corresponding endpoint performed the action related to the another communication session. The method can further comprise transmitting the plurality of graphical identifiers to the corresponding endpoint of at least one of the plurality of profiles.

In other examples, a method comprises establishing a communication session comprising a communication data stream between a plurality of endpoints; initiating, within the communication session, a video call based on a request received from one or more of the plurality of endpoints; generating a plurality of graphical identifiers corresponding to the plurality of endpoints, wherein graphical identifiers that correspond to endpoints that are connected to the video call are graphically distinguished from graphical identifiers that correspond to endpoints that are not connected to the video call; and transmitting the plurality of graphical identifiers to at least one of the plurality of endpoints that has joined the chat data stream and has not joined the video call.

Example Embodiments

A common problem for participants in virtual meetings is that the meetings often begin late, e.g., because participants only begin the meeting after a certain number of other participants arrive or wait until a key individual arrives (e.g., a manager, a client, and the like). In traditional virtual meeting systems only users who are in the meeting (e.g., endpoints that are actively logged into a virtual meeting session) are provide information regarding who is present in the meeting (e.g., a list of other users present in the meeting). Users who are not in the meeting (e.g., endpoints that are not actively logged into a virtual meeting session but may be listed as invitees) have no way of determining which of the invited participants is present in the virtual meeting and which of the invited participants has yet to join the virtual meeting. For example, a key individual (i.e., a manager) would benefit from a system that allows them to quickly identify, before joining the virtual meeting, that all of the other invited participants are present in the meeting. In addition, virtual meeting resources (e.g., servers, graphical processing units) are unnecessarily occupied with processing data associated with virtual meetings that last longer due to the meeting beginning late by processing data associated with virtual meetings that last longer due to the meeting beginning late.

Virtual meetings are distinguished from virtual conversations (as disclosed herein) based, at least in part, on the asynchronous nature of a virtual conversation. Many virtual meeting systems focus on scheduled meetings between invited participants. For example, a scheduled meeting may begin at a specific starting time and conclude at a specific ending time (i.e., where the starting time and the ending are defined before the meeting begins and often agreed upon by all potential participants before the meeting is setup). During the meeting (i.e., between the starting time and the ending time), invited participants can share audio and/or video, chat, desktop share, etc. In contrast, a virtual conversation is inclusive of a continuous stream of communication data (e.g., messages, files, video call, other activities) that can be asynchronously generated and accessed between participants (and is not a scheduled meeting). The participants need not be present in the virtual conversation at the same time (as is required for traditional virtual meetings). For example, a user can log into a virtual conversation, send messages to any other participants who are simultaneously connected to the virtual conversation. Any users who are not simultaneously connected to the virtual meeting system, can asynchronously access the messages (e.g., can view any new messages the next time they login). Once the virtual conversation is established, ad-hoc "meetings" or video calls can be initiated (or terminated) within the virtual meeting at any time without formal consensus or a specified start time or end time. The virtual conversations can involve chat, audio/video, desktop share, file sharing or other communication data.

The systems and methods described herein address the above problem (and others) by providing a graphical processing module (e.g., a graphical processing unit (GPU)) that generates, for (invited) participants in a virtual meeting or virtual conversation, graphical data indicating which of the invited participants is present in the virtual conversation (or virtual meeting) and which of the invited participants has yet to join the virtual conversation (or virtual meeting). Such graphical data can be transmitted to endpoints that are connected to a meeting (e.g., involving video/audio) within a virtual conversation and to endpoints that are connected only to a chat within the virtual conversation (e.g., endpoints that have not joined the meeting). In addition, the graphical data can also indicate the manner in which each of the participants is connected to the meeting. This, advantageously, enables each user to see who is connected to the meeting, who is only connected to the chat, and who may be absent from both. This may improve the user experience (and productivity of users) by allowing users to more readily determine an appropriate time to join a virtual conversation. Additionally, such features represent an improvement to the operation of virtual meeting resources (e.g., one or more servers, GPUs) due, at least in part to improving the efficiency of virtual conversations (e.g., based on users having efficient access to participant information in an interface bar). The systems and methods described herein are equally applicable to virtual meetings and/or to virtual conversations.

FIG. 1 is a simplified block diagram illustrating a communication system 100 for generating graphical identifiers in a virtual collaborative environment. In specific implementations, communication system 100 can be provisioned for use in generating, managing, hosting, and/or otherwise providing virtual meetings. In certain scenarios (many of which are detailed below), communication system 100 may be configured for generating graphical identifiers. The architecture of communication system 100 is applicable to any type of conferencing or meeting technology such as video conferencing architectures (e.g., TELEPRESENCE), web cam configurations, smartphone deployments, personal computing applications (e.g., SKYPE), multimedia meeting platforms (e.g., MEETINGPLACE, WEBEX, other virtual meeting client, etc.), desktop applications, or any other suitable environment in which video data is sought to be managed.

Communication system 100 may include any number of endpoints 112a-e that can achieve suitable network connectivity via various points of attachment. In this particular example, communication system 100 can include an Intranet 120, a telephony network 122, and an Internet 124, which (in this particular example) offers a pathway to a data center web zone 130 and a data center meeting zone 140. Telephony network 122 may include, among other things, a voice over Internet protocol (VoIP) gateway and a public switched telephone network (PSTN).

Data center web zone 130 includes a plurality of web servers 132, a database 134, and a recording element 136. Data center meeting zone 140 includes a secure sockets layer hardware (SSL HW) accelerator 142, a plurality of multimedia conference servers (MCSs)/media conference controller (MCC) 144, a collaboration bridge 146, a meeting zone manager 148, and a graphical processing module 150. As a general proposition, each MCS can be configured to coordinate video and voice traffic for a given virtual meeting. Additionally, each MCC can be configured to manage the MCS from data center meeting zone 140. Each of endpoints 112a-e can be provisioned with one or more virtual meeting applications. A virtual meeting application may comprise, e.g., a virtual meeting client, a graphical processing module, or both (operably coupled to one another). A virtual meeting client is operable (e.g., by an endpoint) to establish a connection to a virtual meeting session. The graphical processing module is operable to, among other things, generate a plurality of graphical identifiers corresponding to a plurality of profiles.

Note that various types of routers and switches can be used to facilitate communications amongst any of the elements of FIG. 1. For example, a call manager element 116 and a unified border element 118 can be provisioned between telephony network 122 and Intranet 120. The call manager element is a network manager for IP phones. Also depicted in FIG. 1 are a number of pathways (e.g., shown as solid or broken lines) between the elements for propagating meeting traffic, session initiation, and voice over Internet protocol (VoIP)/video traffic.

Semantically, the virtual meeting application is a client and server application. In some embodiments, the virtual meeting application may be a web-based application. A client module can be loaded onto an end user's endpoint via one or more webpages. A software module (e.g., a plug-in application, or an stand-alone application) can be delivered to a respective endpoint via the webpages. The software can be downloaded (or suitably updated) before participating in the meeting. If the software module is already resident on the end user's endpoint (e.g., previously downloaded, provisioned through any other type of medium (e.g., compact disk (CD)), then while attempting to participate in a virtual meeting, that software module would be called to run locally on the endpoint. This allows a given endpoint to establish a communication with one or more servers (e.g., provisioned at data center meeting zone 140 and/or data center web zone 130).

Static data can be stored in data center web zone 130. For example, the scheduling data, the login information, the branding for a particular company, the schedule of the day's events, etc. can all be provided in data center web zone 130. Once the meeting has begun, any meeting experience information can be coordinated (and stored) in data center meeting zone 140. For example, if an individual were to share a document, or to pass the ball (i.e., pass control of the meeting), then that meeting experience would be managed by data center meeting zone 140. In a particular implementation, data center meeting zone 140 is configured to coordinate the graphical identifier generation activities with endpoints 112a-e (e.g., via software modules). Details concerning that possible implementation are described below with reference to FIG. 10.

In order to initiate joining a virtual meeting, an endpoint may connect to any point of attachment. Hence, a client (e.g., a virtual meeting client) can perform appropriate operations to join a previously scheduled virtual meeting. The endpoint can be redirected to data center meeting zone 140 (as shown in FIG. 1). The meeting zone manager 148 can direct the endpoint to connect to a specific collaboration bridge server for joining the upcoming meeting. If the meeting has VoIP/video streams, then the endpoint also connects to a given server (e.g., an MCS) to receive those streams. In some examples, the client is operably connected to the meeting (i.e., has completed joining the meeting) when the client connects to any one or more data stream included in the meeting. For example, the client may be determined to be connected to the meeting based on being: connected to a voice data stream, connected to a video data stream, connected to a integrated data stream including both voice and video. Operationally, when the client joins the virtual meeting (e.g., and launches integrated voice and video) there are two connections being established to the collaboration bridge and to the MCS. For the collaboration bridge, one connection is established to send data and a second connection is established to receive data. For the MCS, one connection is established for control and the second connection is established for data. As the meeting begins, the meeting host may initially have control of the meeting (i.e., by default). The meeting is operational between the endpoint and other endpoint devices, which followed a similar initiation protocol to join the meeting.

Figure 2:
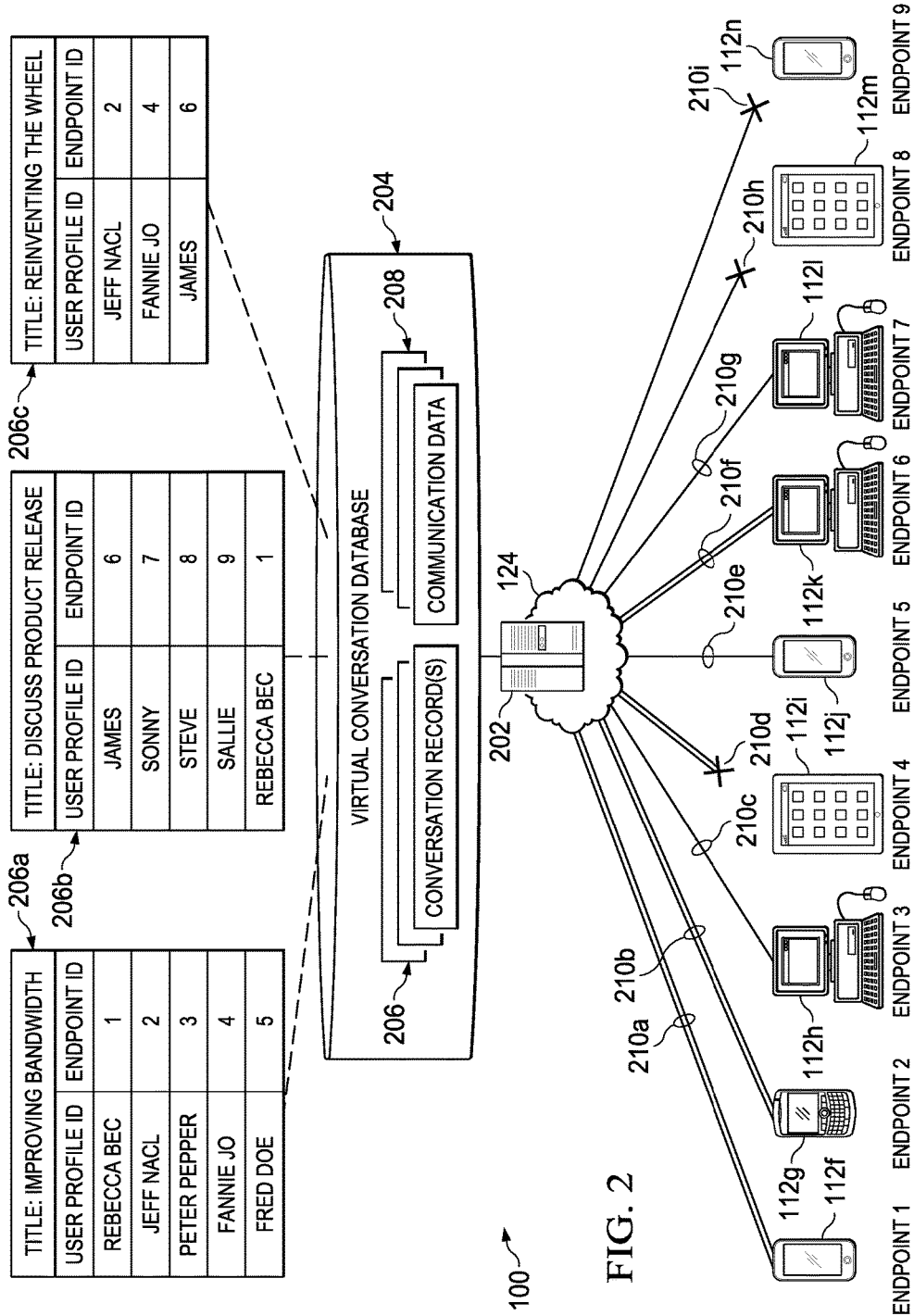
FIG. 2 is a simplified schematic diagram illustrating additional details of the communication system in the context of a virtual conversation system, in accordance with some embodiments of the present disclosure.

FIG. 1 illustrates an exemplary communication system 100 in the context of a virtual meeting system. FIG. 2 illustrates additional details of communication system 100 in the context of a virtual conversation system.

FIG. 2 provides additional details of communication system 100. In particular, FIG. 2 illustrates the communication system 100 configured to generate a plurality of graphical identifiers corresponding to a plurality of profiles (e.g., user profiles) according to some embodiments of the present disclosure. The system includes a plurality of endpoints 112f-112n, Internet 124, one or more servers 202, and a virtual conversation database 204. The one or more servers 202 provide each of the plurality of endpoints 112f-n with access to one or more virtual conversations. Communication sessions 210a-i are created between each of the endpoints 112f-n and the one or more servers 202 (e.g., the servers) over the Internet 124. A communication data stream includes data defining a virtual conversation. Throughout the present disclosure the terms 'communication data stream' and 'virtual conversation' are used interchangeably. The terms 'communication data stream' and 'virtual conversation' relate to a stream of data that is asynchronously generated and asynchronously accessed between participants. The participants need not be present simultaneously accessing the data at the same time. Once a virtual conversation (or communication data stream) is established, ad-hoc "meeting" or video calls can be initiated (or terminated) within the virtual meeting at any time without formal consensus or a specified start time (or end time). The virtual conversations can involve chat, audio/video, desktop share, file sharing or other communication data. Each of the one or more virtual conversations is provided (by the servers) as a stream of communication data (i.e., a communication data stream) transmitted over a corresponding one of the communication sessions 210a-i. For example, endpoint 112f is connected to communication session 210a, which provides two communication data streams (e.g., corresponding to virtual conversation records 206a and 206b which involve the endpoint 112f (i.e., endpoint 1)). Endpoint 112h is connected to communication session 210c, which provides to one communication data stream (e.g., corresponding to virtual conversation records 206a and 206a which involves the endpoint 112h (i.e., endpoint 3)). In addition to endpoints 112f and 112h, endpoints 112g, 112j, 112k, and 112l are respectively connected to communication sessions 210b, 210e, 210f and 210g, through which one or more communication data streams is received. Each of endpoints 112f, 112g, 112h, 112j, 112k, and 112l is connected to a live and open communication session. That is, at this particular instance in time illustrated in FIG. 2, each of endpoints 112f, 112g, 112h, 112j, 112k, and 112l is presently connected to the communication session. In contrast, each of endpoints 112i, 112m, and 112n and is not connected to a communication session. Instead, each of 112i, 112m, and 112n has terminated a communication session as indicated by 210e, 210h, and 210i.

Communication sessions are created for example, when a user logs on to the communication system 100 using an endpoint. For example, a user may use any of the endpoints 112f-n to input user credentials (e.g., a user identifier, password, or other data) into an interface associated with the communication system 100. The endpoint receives the user credentials and transmits the credentials to the one or more servers 202. The server receives the input of user credentials and (e.g., upon verifying the user credentials) establishes a communication session with the endpoint (e.g., sessions 210a-i). The server may store an association between an identifier of the endpoint and a profile for which the endpoint transmitted correct user credentials. For example, the endpoint 112f is used to establish a connection to the one or more servers for a user profile identified by the identifier (i.e. name) "Rebecca Bec". The server stores an association between an identifier of the endpoint (i.e., endpoint 1) and the user profile identifier "Rebecca Bec". Based on the stored association, the server can identify the user profile with which to associate any data that is received from the endpoint. Once the endpoint is logged in (e.g., has established a communication session), the server may retrieve, from database 204, all conversation records and communication data corresponding to virtual conversations in which the user profile is involved.

Each of the communication data streams involves a plurality of profiles (e.g., user profiles). These profiles correspond to users who are involved in the virtual conversation (e.g., have been added as participants in the virtual conversation). The one or more servers 202 generate the communication data streams based on data retrieved from virtual conversation database 204 and/or data received from any of the plurality of user profiles involved in each virtual conversation.

The virtual conversation database 204 comprises conversation records 206 and communication data 208. The conversation records 206 store, among other things, basic information on virtual conversations. For example, each conversation record includes a list of users that are participants in the virtual conversation (e.g., as identified by a user profile identifier), a title of the conversation, and/or a reference to corresponding communication data associated with the virtual conversation. The communication data 208 contains data generated by each of the plurality of profiles in a conversation. The communication data may include, e.g., the content of any messages or files transmitted between the participants and/or a log of any actions taken within the conversation (e.g. initiating a call, canceling a call, transmitting a file, downloading the file, accepting a video call, etc.). The communication data is transmitted, over communication sessions 210, to corresponding participants in the virtual conversation (e.g., as a data stream). The conversation record identifies the meeting and its participants. The communication data stores the contents of any communications and logs the communications and/or the times corresponding to transmission or receipt of any of those communications in order to enable recreating the chronology of the conversation.

FIG. 2, includes several exemplary instances of conversation records 206a-c. Each of the conversation records 206a-c includes a plurality of profiles. In this case, the conversation records store an identifier corresponding to the profile and an identifier corresponding to an endpoint through which the user profile last accessed a communication session to the one or more servers 202. A user profile stores data that identifies a user. For example, the user profile may store a photo of the user, a name of the user address, a phone number, or any other information identifying the user and/or attributes of the users. The conversation record 206a is titled "Improving bandwidth". This conversation record includes user profile identifiers "Rebecca Bec", "Jeff Nacl", "Peter Pepper", "Fannie Jo", and "Fred Doe", which correspond to endpoint identifiers 1, 2, 3, 4, and 5, respectively. Conversation record 206b is titled "Discuss Product Release". The conversation record 206b includes user profile identifiers "James", "Sonny", "Steve", "Sallie", and "Rebecca Bec", which correspond to endpoint identifiers 6, 7, 8, 9, and 1, respectively. Conversation record 206c is titled "Reinventing The Wheel". The conversation record 206c includes user profile identifiers "Jeff Nacl", "Fannie Jo", and "James", which correspond to endpoint identifiers 2, 4, and 6, respectively.

Each user can be simultaneously associated with more than one conversation records. For example, the user profile identifier "Rebecca Bec" (which corresponds to endpoint 1) is associated with conversation records 206a and 206b. The user profile identifier "Jeff Nacl" (which corresponds to endpoint 2) is associated with conversation records 206a and 206c. Likewise, the user profile identifier "James" (which corresponds to endpoint 6) is associated with conversation records 206b and 206c. The other user profiles are only associated with one of the conversation records 206a-c.

When each user logs into the system, the one or more servers 202 may retrieve, from the virtual conversation database 204, only the conversations in which the user is involved. For each of the virtual conversations in which the user is involved, the one or more servers 202 may determine whether the other users, that are associated with the virtual conversation record, are connected to the system. For example, when the endpoint 112f (i.e., corresponding to the user profile identifier "Rebecca Bec" and endpoint identifier 1) logs in, the one or more servers may determine that the endpoint is involved in the conversations corresponding to records 206a and 206b (e.g., because the user profile identifier matches one in the record). For each of records 206a and 206b, the one or more servers may determine whether each of the other users listed in the records is presently connected to a communication session with the one or more servers. In this example, the one or more servers would make a determination that endpoints corresponding to endpoint identifiers 2, 3, 5, 6, and 7 are presently connected to the one or more servers; and would make a determination that endpoints corresponding to endpoint identifiers 4, 8, and 9 are not presently connected to the one or more servers.

Figure 3:
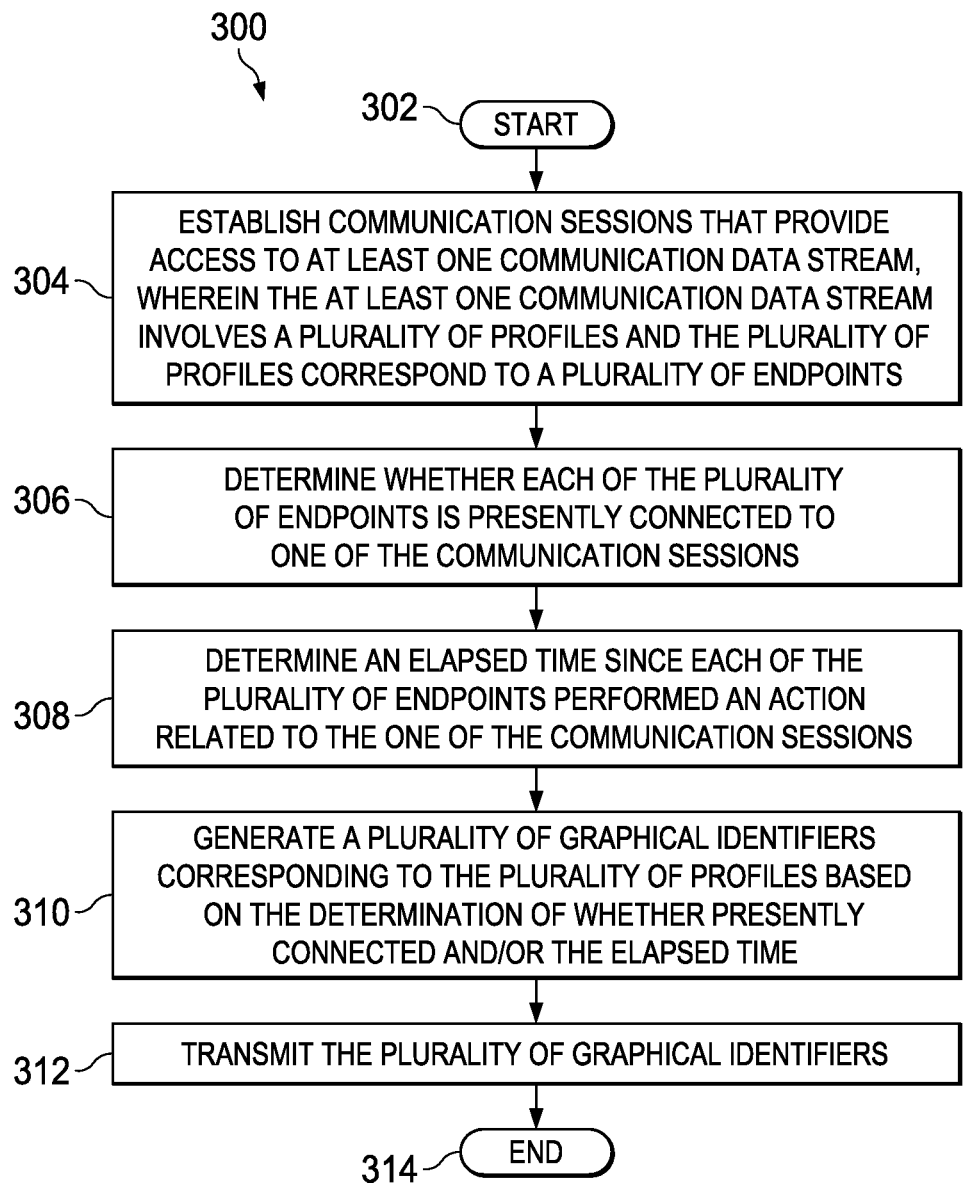
FIG. 3 illustrates an exemplary logic for generating graphical identifiers in accordance with some embodiments of the present disclosure

FIG. 3 illustrates an exemplary logic (logic 300) for generating graphical identifiers in accordance with some embodiments of the present disclosure. Logic 300 begins at 302 and advances to 304 where communication sessions that provide endpoints with access to at least one communication data stream are established. The communication session is a channel through which an endpoint can access the at least one communication data stream (e.g., virtual conversations). The at least one communication data stream involves a plurality of profiles. For example, each of the at least one communication data stream may include a list of user profiles stored in a conversation record 206 (FIG. 2). The plurality of profiles corresponds to a plurality of endpoints. At 306, a determination is made as to whether each of the plurality of endpoints is presently connected to one of the communication sessions. The conversation records may be used to correlate endpoints to user profiles. Thus, the determination can, in effect, identify which of the users is presently connected to one of the communication sessions (e.g., has logged into a corresponding application) At 308, a determination is made of an elapsed time since each of the plurality of endpoints performed an action related to the each of the communication sessions. The elapsed time may relate to the time at which a user logged into the system 100 and/or when they performed an action within one of the at least one communication data stream (e.g., a virtual conversations). At 310, a plurality of graphical identifiers corresponding to the plurality of profiles is generated based on the determination of whether presently connected and/or the elapsed time. The graphical identifiers may be generated having various visual effects. For example, several options of graphical identifiers may exist for each profile. The various visual effects can be applied to any of the available options of graphical identifiers (to produce differing visual effects), or a particular graphical identifier may be selected from the options based on having an existing visual effect (e.g., selecting graphical identifiers that are visually different to indicate connectivity and/or the elapsed times. At 312, the plurality of graphical identifiers is transmitted. For example, the one or more servers may transmit the plurality of graphical identifiers to each of the endpoints involved in a particular virtual conversation. Subsequent to the plurality of graphical identifiers being transmitted, the logic 300 ends at 314.

Figure 4A:
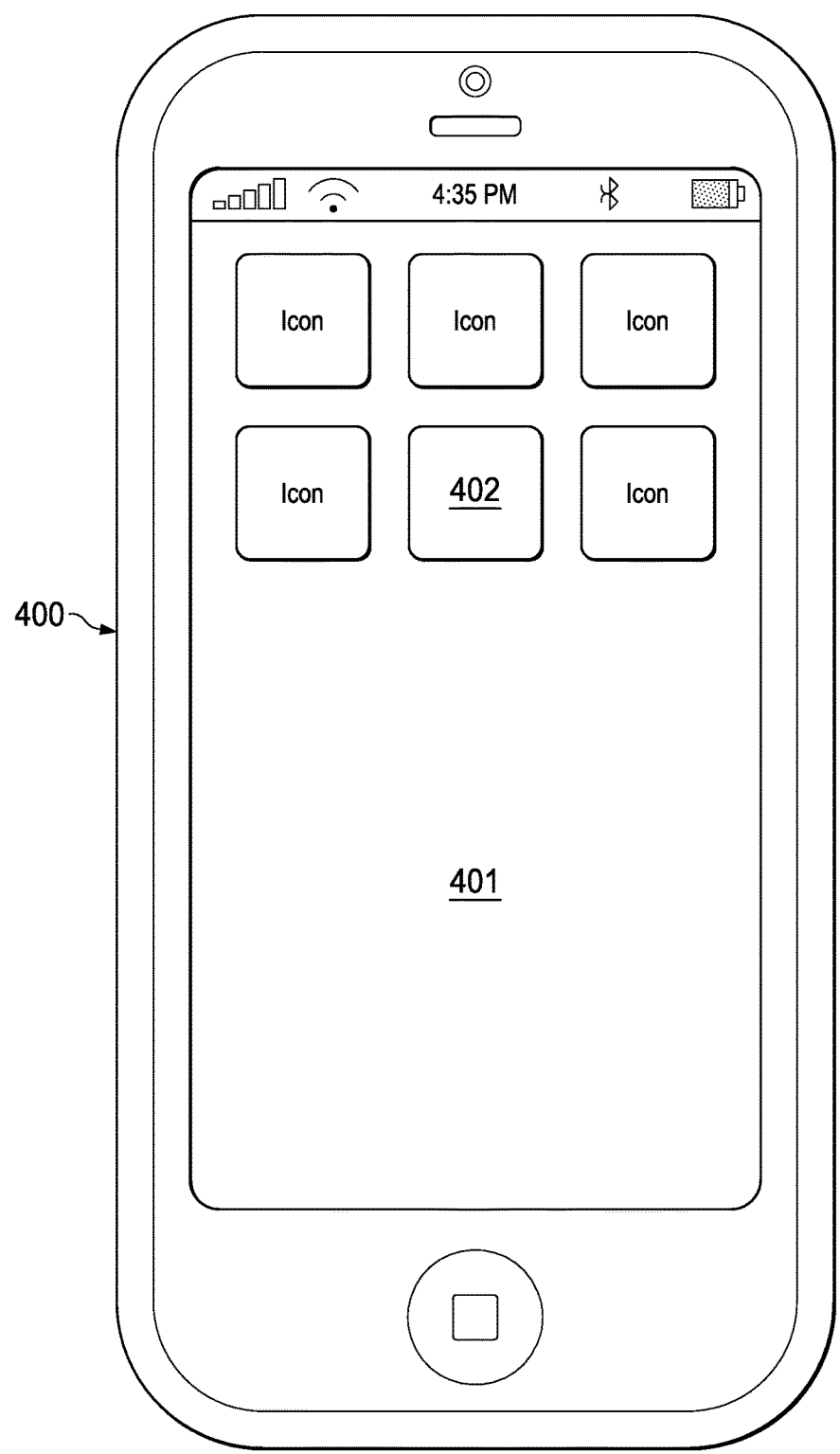
FIGS. 4A, 4B, 4C, 5A, 5B, 5C, 5D, 5E, 5F, 5G, 6A, 6B, 7, 8A, 8B, 8C, 9A, and 9B are simplified schematic diagrams illustrating example user interface graphics associated with possible implementations of the communication system.
Figure 4B:
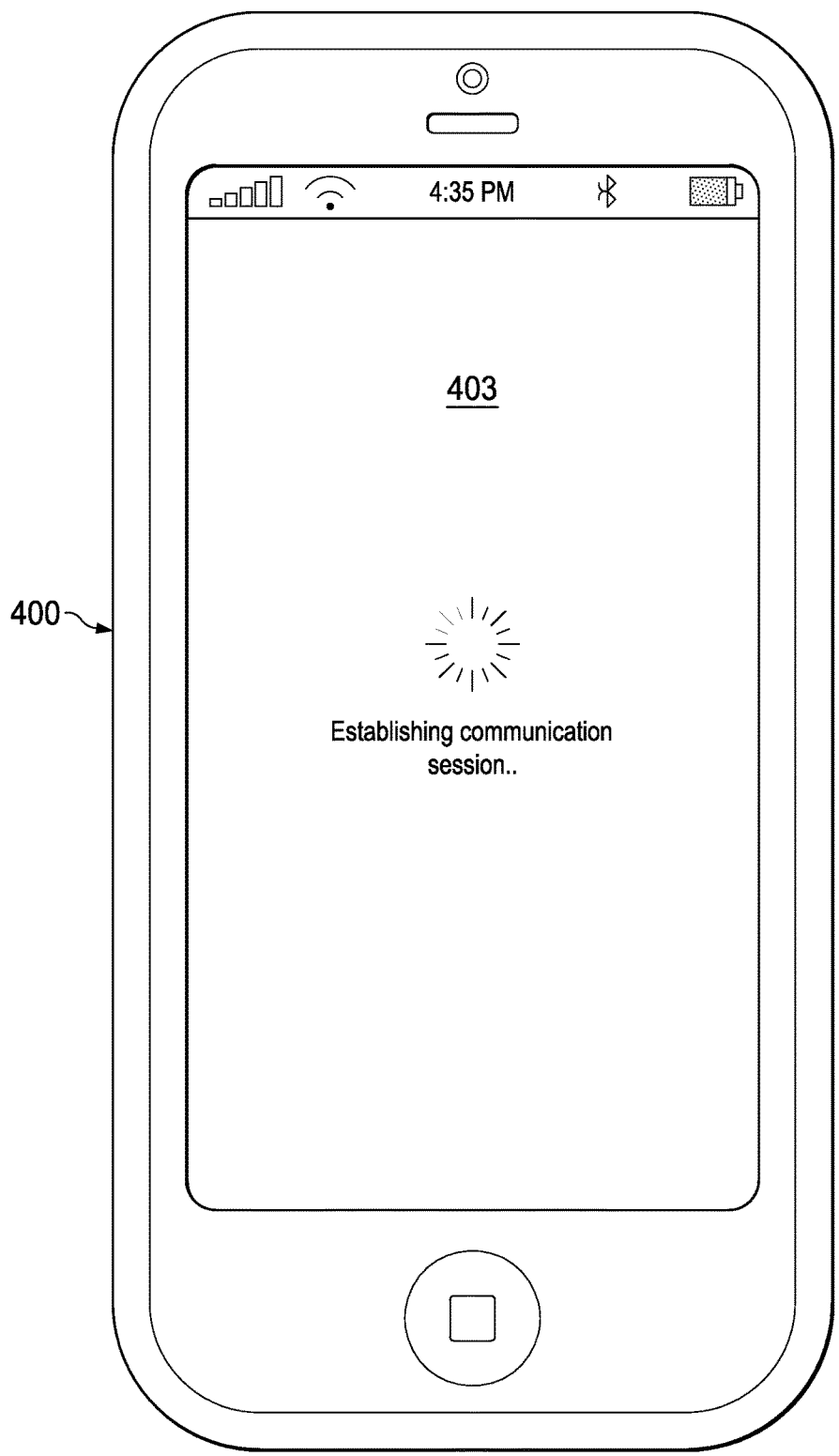
Figure 4C:
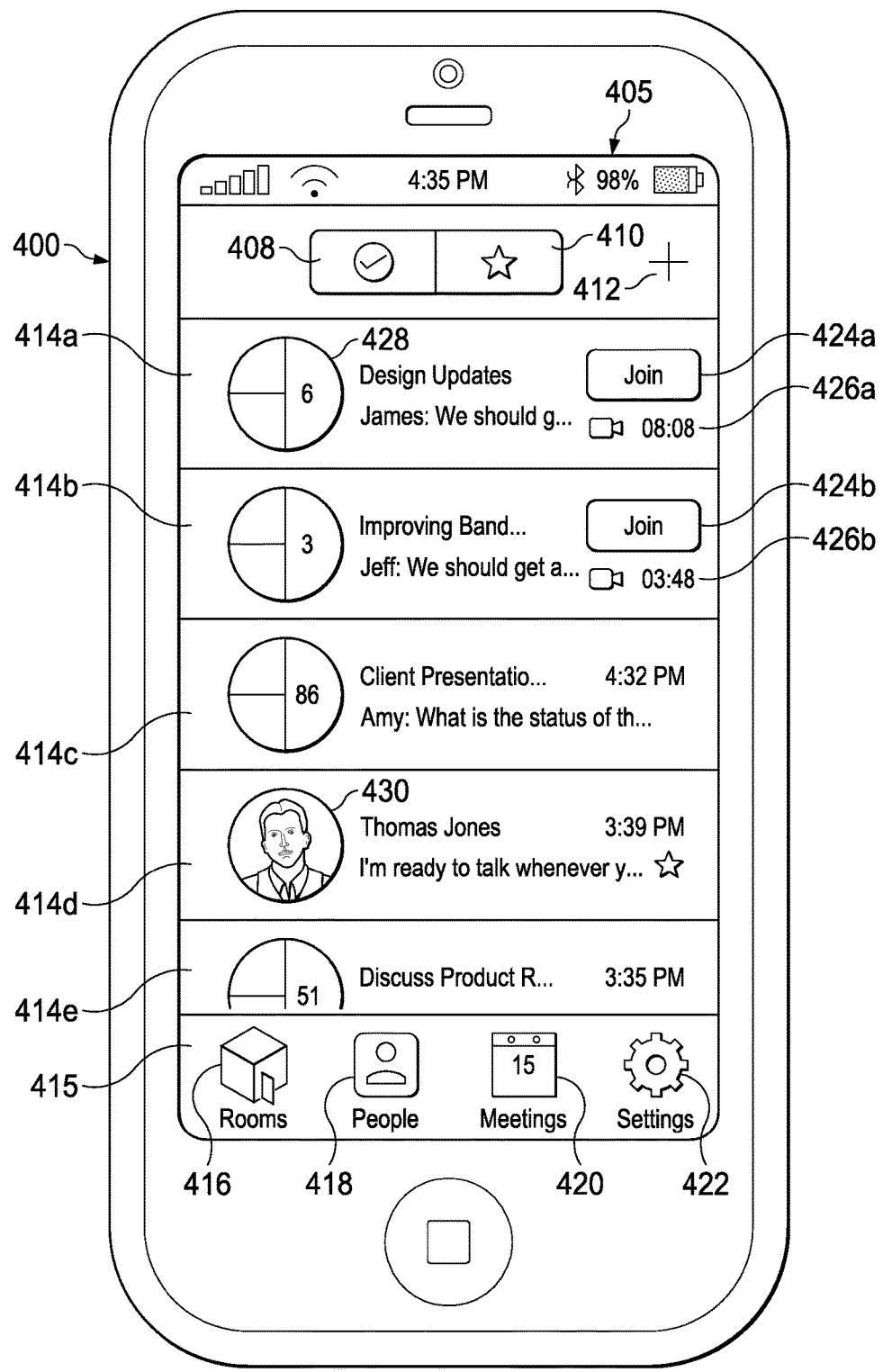

FIGS. 4A, 4B, and 4C illustrate exemplary user interface graphics according to embodiments of the present disclosure. In particular, the user interface graphics of FIGS. 4A-C corresponds to an exemplary graphical user interface application associated with a communication session. Each of FIGS. 4A, 4B, and 4C illustrate exemplary endpoint 400 executing the graphical user interface application. In this example, the endpoint 400 corresponds to endpoint 112f (i.e., corresponding to the user profile identifier "Rebecca Bec" and endpoint identifier 1 in FIG. 2). As such, some of the user interface graphics may be described in the context of examples that follow how Rebecca's endpoint may operate in conjunction utilizing such user interface graphics.

Turning to FIG. 4A, FIG. 4A illustrates interface 401, which comprises a plurality of icons including icon 402. The icon 402 is operable to execute a graphical user interface application associated with a communication session to one or more servers. When the endpoint 400 receives a selection of icon 402, the endpoint executes of the graphical user interface application by endpoint 400.

Turning to FIG. 4B, FIG. 4B illustrates an exemplary interface 403. In this example, the graphical user interface application renders the interface 403 to identify that application is currently establishing a communication session (e.g., to the one or more servers 202 in FIG. 2). During establishment of the communication session, the endpoint 400 may be transmitting credentials corresponding to the user profile "Rebecca Bec" to the one or more servers 202. When the servers have received the credentials and have determined that the credentials are correct and correspond to the user profile "Rebecca Bec", the servers may generate and open a communication session (e.g., session 210 in FIG. 2) with endpoint 400 that provides the endpoint 400 with access to at least one communication data stream. Once the communication session is open, the one or more servers 202 may look up, within database 204, any conversation records that including the user profile identifier "Rebecca Bec" (which corresponds to the user profile for which the communication session was established). In the exemplary conversation records 206a-c of FIG. 2, each of the conversation records 206a and 206b include user profile identifier "Rebecca Bec"; the conversation record 206c does not include user profile identifier "Rebecca Bec". Thus, the servers retrieve only conversation records 206a and 206b. Once the records 206A in 206B are retrieved, the server 202 transmits, over the communication session to endpoint 400, communication data corresponding to the conversation records 206a and 206b. The endpoint 400 renders the data using a graphical user interface application as illustrated in FIG. 4C.

Turning to FIG. 4C, FIG. 4C illustrates interface 405. The interface 405 includes, among other things, a plurality of listings 414a-e. Because each user profile may be simultaneously associated with a plurality of virtual conversations, this interface displays the plurality of virtual conversations (i.e., conversation records retrieved from database 204) for the user profile "Rebecca Bec". In this example, the user profile "Rebecca Bec" is associated with at least five virtual conversations corresponding to each of listings 414a-e. Each listing includes indicia identifying a title of the corresponding conversation and identifies, at least a portion of, and last message transmitted by a participant in the conversation. The listing 414a includes interface component 428, indicia, button 424a, and timer 426a. The indicia in the listing 414a identify that the title of the virtual conversation is "Design Updates" and include, at least a portion of, a last message transmitted in the virtual conversation (i.e., in this case by the user "James"). Together, the button 424a and the timer 426a indicate that the conversation corresponding to listing 414a currently includes a video call associated. For example, one of the users in the conversation may have generated, using their corresponding endpoint, a request to initiate a video call within the communication data stream. The button 424a is operable to accept the video call (i.e., for the conversation titled "Design Updates"). When a selection is received at button 424a, the endpoint 400 generates (and/or retrieves) a user interface corresponding to the details of the "Design Updates" conversation (e.g., including message content) and also connect the endpoint 400 to the video call portion of the virtual conversation. Connecting the endpoint 400 to the video call portion of the virtual conversation may comprise the endpoint 400 streaming data from a camera and/or microphone coupled to the endpoint 400 to the one or more servers 202 for transmission to other endpoints involved in the conversation. The timer for 426a identifies an amount of elapsed time since the video call was initiated. In this case, the video call was initiated eight minutes and eight seconds ago (i.e., 08:08). The interface component 428 comprises a circle. A single vertical line that bifurcates the circle into halves and a single horizontal line extending only from the left side of the vertical line in bifurcates the left half of the circle into to quarters of the circle. The right half of the circle includes the number "6", which identifies the number of user profiles involved in the virtual conversation. Within the two quarter circles are displayed, at least in part, a photo from of the two most active users user profiles in the virtual conversation. In this example, the number and photos provide the user with information on the amount of activity and active users within the meeting. However, in other examples the interface component or portion therein may identify any measure of a level of activity, photos of users who are first when all user profiles are sorted alphabetically (e.g., by first or last name), or other attributes of the virtual conversation. The listing 414b corresponds to the conversation record 206a in FIG. 2. The listing 414b includes interface component 428, indicia, button 424b, and timer 426b. The indicia in the listing 414b identify, at least a portion of the title of the virtual conversation "Improving Bandwidth" and include, at least a portion of, a last message transmitted in the virtual conversation (i.e., in this case by the user "Jeff"). The button 424b and the timer 426b operate in a manner similar to that described for listing 414a and are not repeated here only for the purpose of brevity. The listing 414c includes indicia identifying, at least a portion of the title of the virtual conversation "Client Presentation" and includes, at least a portion of, a last message transmitted in the virtual conversation (i.e., in this case by the user "Amy"). In addition, the listing 414c includes in indicia identifying a time at which the last message was transmitted within the communication session. In this case, the indicia identify that the last message was transmitted at 4:32 PM. The listing 414d corresponds to a virtual conversation including one other user (i.e., Thomas Jones). That is, the conversation corresponding to listing 414d includes, Thomas Jones and Rebecca Bec. The listing 414e includes indicia identifying, at least a portion of the title of the virtual conversation "Discuss Product Release"

and includes, at least a portion of, a last message transmitted in the virtual conversation. In addition, the listing 414e includes in indicia identifying identify that the last message was transmitted at 3:35 PM. The listings 414a and 414b correspond to virtual conversations for which an ad-hoc meeting has been initiated (e.g., using a video call). Thus, the listings 414a and 414b include buttons (424a and 424b) and timers (426a and 426b), enabling joining the call and indicated en elapsed time since the call was initiated, respectively. The listings 414c, 414d, and 414e correspond to virtual conversations for which an ad-hoc meeting has not been initiated. Thus, the listings 414c, 414d, and 414e do not include such buttons and timers and instead include the time at which the last message was sent in the virtual conversation.

In addition to the plurality of listings 414a-e, the interface 405 includes interface buttons 408, 410, 412; and a toolbar 415 comprising interface buttons 416, 418, 420, and 422. Interface button 408 is operable to sort the virtual conversations based on an elapsed time since the most recent activity performed within the virtual conversation. Interface button 410 is operable to filter all of the virtual conversations to include only conversation records labeled with a star. The star may be assigned and/or unassigned by the user to any one or more virtual conversations. A star indicates an elevated level of importance to the user over the other conversations (e.g. a favorite for especially important conversation). Thus, when endpoint 400 receives a selection of the interface 410, the endpoint filters out listings that do not include a star, and leaves only listings that include a star. In this case, the only (visible) listing that includes a star is listing 414d. Thus, in this particular example, selecting button 410 is effective to filter each of listings 414a-c and 414e and leave only listing 414d remaining. Interface button 412 is effective to generate a new virtual conversation (e.g., and a corresponding conversation record 206). Upon receiving a selection at button 412, the endpoint 400 may generate a screen enabling selection of plurality of contacts (user profile identifiers, phone number, and the like) to associate with the conversation record. When a user creates a new conversation, the user profile from which the selections are received may also be included (e.g., by default) into the new conversation. Within the toolbar 415, the button 416, labeled "Rooms", is operable to display interface 405 (or other similar interfaces on other devices) including listings of conversations associated with the corresponding user profile. Button 418, labeled "People", is operable to retrieve the plurality of contacts associated with the endpoint 400 and/or plurality of contacts associated with the user profile. Retrieving the contacts may include retrieving one or more contacts that are stored locally on the endpoint 400 and/or retrieving one or more contacts that are stored remotely from endpoint 400. Button 420, labeled "Meetings", is operable to retrieve a calendar of events associated with the user profile. The calendar of events may be retrieved from a meeting server and may include scheduled virtual meetings (as opposed to the current interface 405 which are virtual conversations and/or ad-hoc meetings added to virtual conversations). Button 422, labeled "Settings", is operable to generate an interface enabling modification of one or more settings (e.g., settings defining: whether the application can notify the user, how the listings displayed, a criteria upon which to sorted graphical user identifiers, or any other settings associated with the application and/or the user profile). In a particular example, the one or more servers 202 (FIG. 2) retrieve the conversation records from database 204 for the user profile associated with the application on endpoint 400. In this example, the server 202 retrieved the records 206a and 206b because the user profile "Rebecca Bec" is identified in those conversations. Note that the conversation record 206c was not retrieved for endpoint 400 because the user profile "Rebecca Bec" is not included in the conversation record.

Figure 5A:
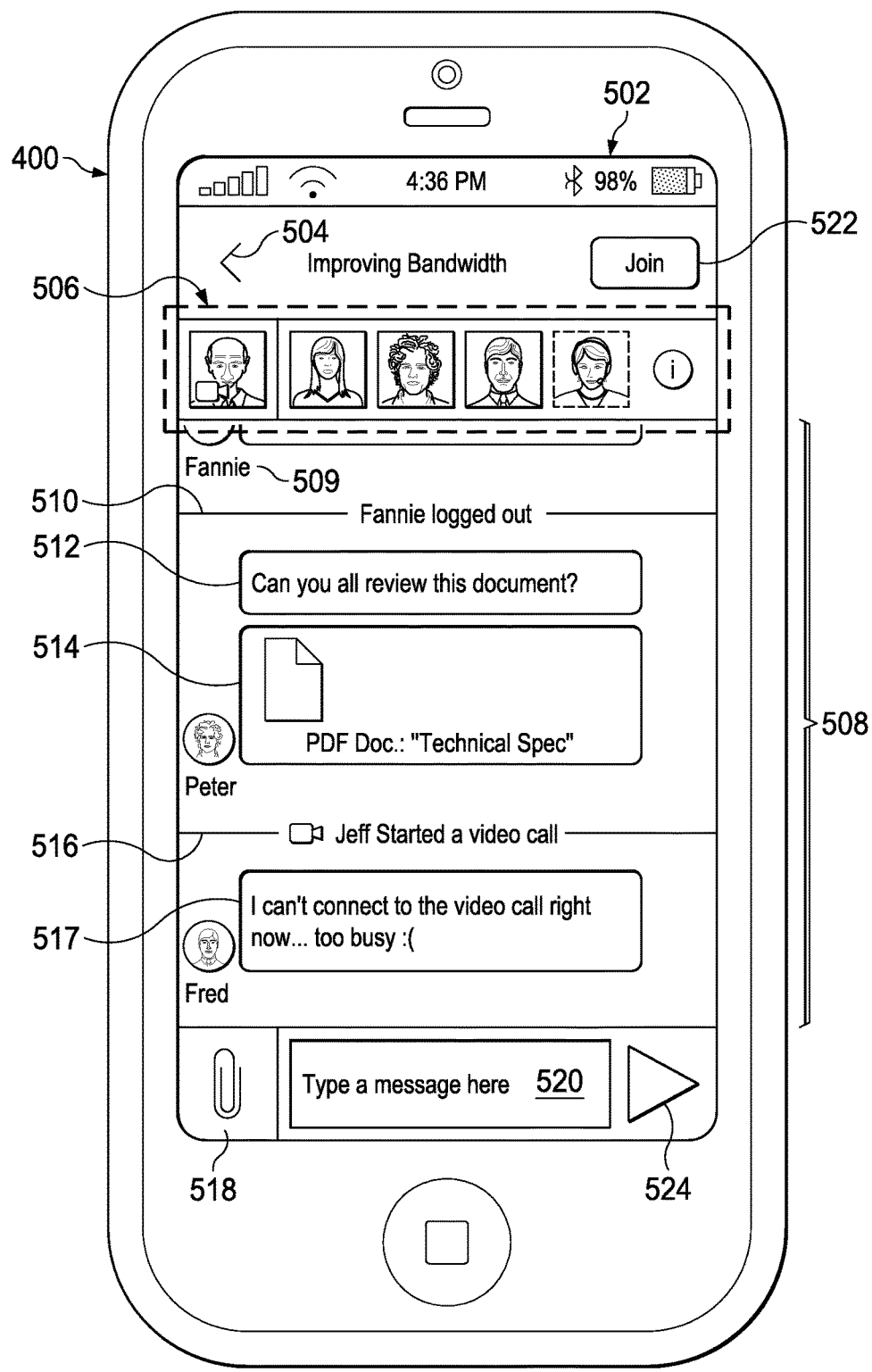
Figure 5B:
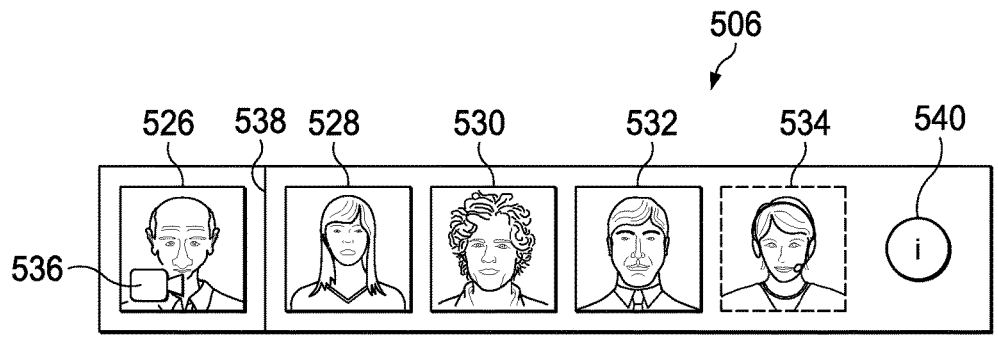
Figure 5E:
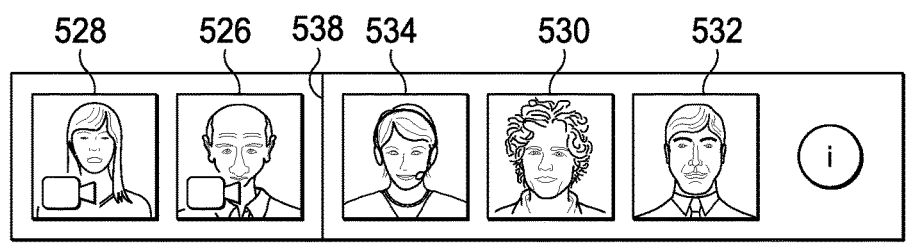
Figure 5F:
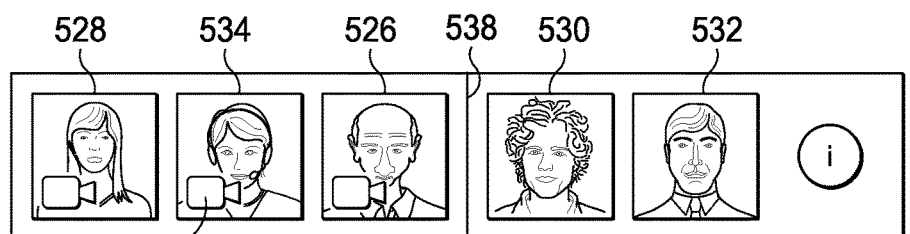
Figure 5G:
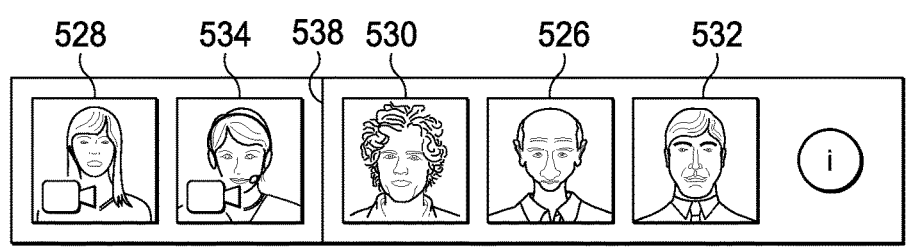
Figure 8A:
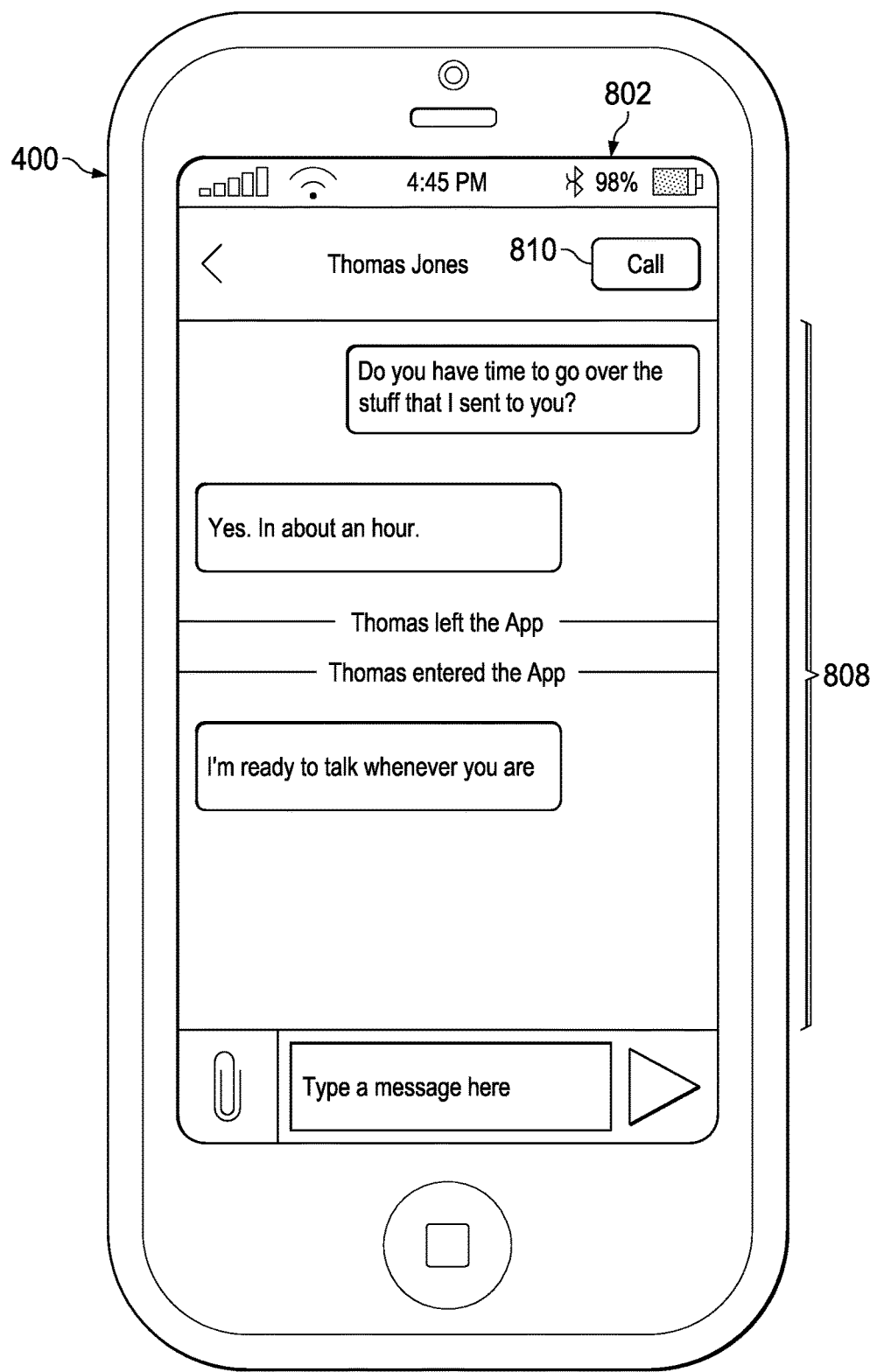

What follows is a discussion of other exemplary user interface graphics described in the context of interface 405 of FIGS. 4A-C and FIG. 2. The user interface graphics of FIGS. 5A, 5B, 5C, 5D, 5E, 5F, and 5G correspond to those generated in the context of the virtual conversation titled "Improving Bandwidth" (i.e., listing 414b in FIG. 4C and conversation record 206a FIG. 2). For example, when the endpoint 400 receives a selection of the listing 414b, the endpoint generates and renders interface 502 as shown in FIG. 5A. The user interface graphics of FIGS. 6A and 6B correspond to those generated in the context of the virtual conversation titled "Discuss Product Release" (i.e., listing 414e in FIG. 4C and conversation record 206b in FIG. 2). For example, when the endpoint 400 receives a selection of the listing 414e, the endpoint generates and renders interface 602 as shown in FIG. 6A. The user interface graphics of FIGS. 8A, 8B, and 8C correspond to those generated in the context of the conversation with Thomas Jones (i.e., listing 414d FIG. 4C). For example, when the endpoint 400 receives a selection of the listing 414d, the endpoint generates and renders interface 802 as shown in FIG. 8A.

FIGS. 5A, 5B, 5C, 5D, 5E, 5F and 5G illustrate exemplary user interface graphics associated with communication data stream (e.g., a virtual conversation) according to some embodiments of the present disclosure. Turning to FIG. 5A, FIG. 5A illustrates interface 502 rendered on device endpoint 400 and correspond to the conversation titled "Improving Bandwidth" (e.g., conversation record 206a in FIG. 2). The interface 502 includes a plurality of interface components including buttons 504, 522, 518, and 524; text box 520; interface bar 506; and communication data 508. The interface bar 506 includes a plurality of graphical identifiers corresponding to the plurality of profiles that are included in the conversation record 206a.

The communication data 508 includes messages 509, 512, and 517; files 514; and log entries 510 and 516. In this example, the interface 502 is generated in response to receiving a selection of the listing 414b in FIG. 4C. Upon receiving the selection of the listing 414b, endpoint 400 may transmit identifiers corresponding to the selected listing (and or identifiers of the corresponding virtual meeting) to one or more servers 202. In response, the one or more servers 202 (i.e., servers 202) may retrieve a list of user profile identifiers that are associated with the virtual meeting (e.g., retrieves the list of user profile identifiers from conversation record 206a). Using the list of user profile identifiers, the servers 202 can determine whether each user profile (using a endpoint identifier corresponding to the user profile) is presently connected to a communication session with the servers 202. In this example, the conversation record 206a includes user profiles corresponding to each of endpoint identifiers 1-5. Thus, the server may determine whether each of endpoints 1, 2, 3, 4, and 5 are presently connected via the corresponding communication session. Using the communication sessions 210 from FIG. 2, the servers 201 identify that each of endpoints 1, 2, 3, and 5 are presently connected to a communication session with one or more servers. However the endpoint 4 (which corresponds to the user profile identifiers "Fannie Jo") is not presently connected to a communication session (e.g., due to communication session being disconnected). The servers 202 also determine an elapsed time since the each of the endpoints performed an action related to a communication session. In this case, the servers 202 determine, for each of the endpoints, an elapsed time since the endpoint established a communication session with the servers or an elapsed time since the endpoint terminated a communication session with the servers, as the case may be. In addition, the server determines the last time each of the endpoints performed a particular action related to a communication data stream (i.e., in this case initiating and or joining a video call in the communication channel).

The communication data 508 is data retrieved from database 204 (e.g. communication data 208) and/or is retrieved from other endpoints in the virtual meeting. For example, historical messages (e.g., sent prior to a current communication session was established) may be retrieved from database 204. However, messages that are received while the user is actively accessing the virtual conversation may be simultaneously stored in the database and transmitted to the endpoints involved in the virtual conversation.

The communication data 508 includes a message 509 (generated by an endpoint corresponding to the user Fannie); a log item 510 which indicates that an endpoint corresponding to the user Fannie and logged out of the application (e.g., disconnected from or closed a communication session); a message 512 including text message generated by an endpoint corresponding to the user Peter; a message 514 including a file transmitted via the communication data stream from Peter; a log item 516 that identifies that Jeff initiated a video call within the communication data stream; and a message 517 including text message generated by an endpoint corresponding to the user Fred. Some contents of the communication data include miniaturized versions of photos retrieved from the user profile are displayed corresponding to the messages from the respective users. This allows other users to quickly identify the user from whom the message is being transmitted.

Button 518 is operable to enable selection of one or more files and transmission of those files via the communication data session. Interface component 520 is a text box that is operative to received textual input and/or hypertext. For example, the endpoint 400 may receive a text message via text box 520. The button 524 is operable to submit any text received in text box 520.

In this example, a video call is presently underway (e.g., a video call was initiated prior to the user Rebecca accessing the virtual conversation). Thus, the interface bar 506 appeared immediately upon generating the interface 504 corresponding to the meeting "Improving Bandwidth". Advantageously, the interface bar 506 provides a summary of the other participants present and logged in to the system (e.g., in a conversation, and/or in video call), and who of the other participants is not. Moreover, a user need not be logged in to the video call to see which of the others users is connected to the video call, who of the other users is not connected to the video call, and who of the users are present in the application. In this case, although the endpoint 400 is not connected to the video call (i.e., the endpoint 400 is not transmitting video/audio to others in the virtual conversation), it receives (via the interface bar 506) a plurality of graphical identifiers; some of the graphical identifiers are video (e.g., video of the users that are connected to the video call) and some the graphical identifiers are still images (e.g., images corresponding to other users profiles that are involved in the virtual conversation but are not connected to the video call). The interface bar 506 generates video data for the single user (Jeff) who initiated the video call. At this point in time, no other users in the virtual conversation have joined the video call (e.g., accepted a request to transmit video data from their respective endpoints). The button 522 is operative to accept the request to initiate the video call (i.e., to join the virtual call). When the device 400 receives an input at button 522, the device 400 joins the call and the interface on device 400 is advanced to interface 505 of FIG. 5D Turning to FIG. 5B, FIG. 5B is a detailed view of interface bar 506. The user interface box 506 includes a plurality of graphical identifiers (e.g., 526, 528, 530, 532, 534) each of which corresponds to a different user profile. In particular, the graphical identifier 526 corresponds to user profile identifier "Jeff Nacl" (endpoint identifier 2); the graphical identifier 528 corresponds to user profile identifier "Rebecca Bec" (endpoint identifier 1); the graphical identifier 530 corresponds to user profile identifier "Peter Pepper" (endpoint identifier 3); the graphical identifier 532 corresponds to user profile identifier "Fred Doe" (endpoint identifier 5); and the graphical identifier 534 corresponds to user profile identifier "Fannie Jo" (endpoint identifier 4). Although the video call was initiated based on a request generated by endpoint 2 (e.g. the user profile identifier "Jeff Nacl"), only endpoint 2 is connected to the video.

In some examples, a determination is made as to whether the corresponding endpoint is connected to the video call. At least one further visual effect may be applied to each of the plurality of graphical identifiers based on such a determination of whether the corresponding endpoint is connected to the video call. The visual effect based on the determination of whether each endpoint is connected to the video call includes providing graphical identifiers corresponding to endpoints connected to the video call with a first visual effect (e.g., selecting from a set options of identifiers for each user and/or applying the visual effect) and providing graphical identifiers corresponding to endpoints for users who are not connected to the video call with a second visual effect (e.g., applying the second visual effect, not applying the first visual effect, or selecting identifiers that have a different visual effect than the first visual effect). In this example, the graphical identifier 526 has a first visual effect of being a streaming video of the corresponding user (i.e., moving images) while the other graphical identifiers (i.e., 528, 530, 532, and 534) are still images. In order to render such still images and video streams, the servers 202 (or the endpoints themselves) may determine whether each of the endpoints is connected to the video call. When it is determined that the endpoint is connected to the video call, the server receives streaming video from the corresponding endpoint. The video stream may be rendered as a graphical identifier as shown in FIG. 5B (e.g., graphical identifier 526). When it is determined that the endpoint is not connected to the call, the server may receive a still image associated with endpoint. The still image may be rendered as a graphical identifier as shown in FIG. 5B (e.g., graphical identifiers 528, 530, 532, and 534). In addition, an icon 536 may be applied to the graphical identifier 526 (e.g., based on being connected to the video call). In some examples, the icon 536, or similar icons, can be applied to (e.g., overlaid upon) graphical identifiers when the corresponding user is connected to the video call by a telephone or other audio input device that does not have video detection capabilities. An icon is not applied to graphical identifiers 528, 530, 532, and 534 because the corresponding endpoints are not connected to the video call.

As a further example, a visual effect being based on the determination of whether an endpoint is connected to the video call, the graphical identifiers are grouped into two separate portions. In the example of FIG. 5B, the graphical identifiers corresponding to endpoints that are connected to the video call are grouped to the left of a vertical bar 538; and graphical identifiers corresponding to endpoints that are not connected to the video call are grouped to the right of a vertical bar 538. The vertical bar 538 is a visual delineation between a first portion (e.g., those connected) and a second portion (e.g., those not connected) of the interface bar 506. All of the endpoints corresponding to graphical identifiers within the second portion share the feature of not being connected to the video. However, some of the endpoints corresponding to the second portion are connected to a communication session with one or more servers and others are not. Thus, the graphical identifiers within the second portion have further visual effects based on whether the corresponding endpoint is connected to a communication session with one or more servers.

Each of the plurality of graphical identifiers has at least one visual effect that is based on a determination of whether the corresponding endpoint is presently connected to a communication session with the one or more servers 202, and has at least one additional visual effect that is based on the elapsed time since the corresponding endpoint performed the action related to the communication session. In this case, such a determination may be made by the one or more servers 202 or by the endpoint itself. If the servers make such a determination, the graphical identifiers are transmitted from the server to the endpoint. In this example, the at least one visual effect includes graphical identifiers being either gray scale or full color (e.g., based on the application or non-application of an image filer). Each of the graphical identifiers 528, 530 and 532 correspond to endpoints that are presently connected to a communication session with the one or more servers. The graphical identifier 534 corresponds to an endpoint that is not presently connected to a communication session with the one or more servers. The graphical identifiers 528, 530, and 532 are rendered in full-color based on the corresponding endpoint being connected to a communication session. In contrast, the graphical identifier 534 is rendered in gray scale based on the corresponding endpoint not being connected to a communication session (e.g., is disconnected from the communication session) with one or more servers. Thus each of the graphical identifiers 526, 528, 530, 532, and 534 has a visual effect that is based on a determination of whether each of the corresponding endpoints is presently connected to a communication session with the one or more servers. In addition, each of the graphical identifiers 528, 530, 532, and 534 has at least one additional visual effect that is based on an elapsed time since each of the corresponding endpoints performed an action related to a communication session. In this example, the at least one additional visual effect includes an order in which the graphical identifiers 528, 530, 532, and 534 are placed within the bar interface bar 506. For example, the order (when read from left to right) is in ascending order of elapsed time since the corresponding user profile logged into the communication system 100 (e.g., connected to a communication session with the one or more servers 202). In this example, the user identifier 528 corresponds to the user who most recently log into the system followed by 530 and then 532. In this example, the user corresponding to graphical identifier 534 is the only user who is currently not connected to the communication session. If there were other users not connected to a communication session, they would also be sorted in their own individual group to the right of the users who are currently connected to a communication session. For example, if there were another user who had been disconnected from a communication session prior to disconnection by the user corresponding to graphical identifier 534, the graphical identifier of the another user would be located to the right of graphical identifier 534 (i.e., because the amount of elapsed time for the would be greater than that of the user corresponding to graphical identifier 534).

In this case, the graphical identifiers having various visual effects may be based on the system having several options of graphical identifiers for each user (e.g., a still image retrieved from the user profile, a still image retrieved from the endpoint, a streaming video of the retrieved from the endpoint). The various visual effects can be applied to any of the available options of graphical identifiers (to produce e.g., first and second effects), or a particular graphical identifier may be selected from the options based on having an existing visual effect (e.g., selecting video-based graphical identifiers for some users and still-images-based graphical identifiers for others, e.g., to produce first and second visual effects).

User interface button 540 is operable to retrieve detailed information on each of the participants in the virtual conversation (i.e., the user profiles to which the graphical identifiers correspond). Upon receiving a selection at button 540, the device 400 generates interface 503 as illustrated in FIG. 5C.

Figure 5C:
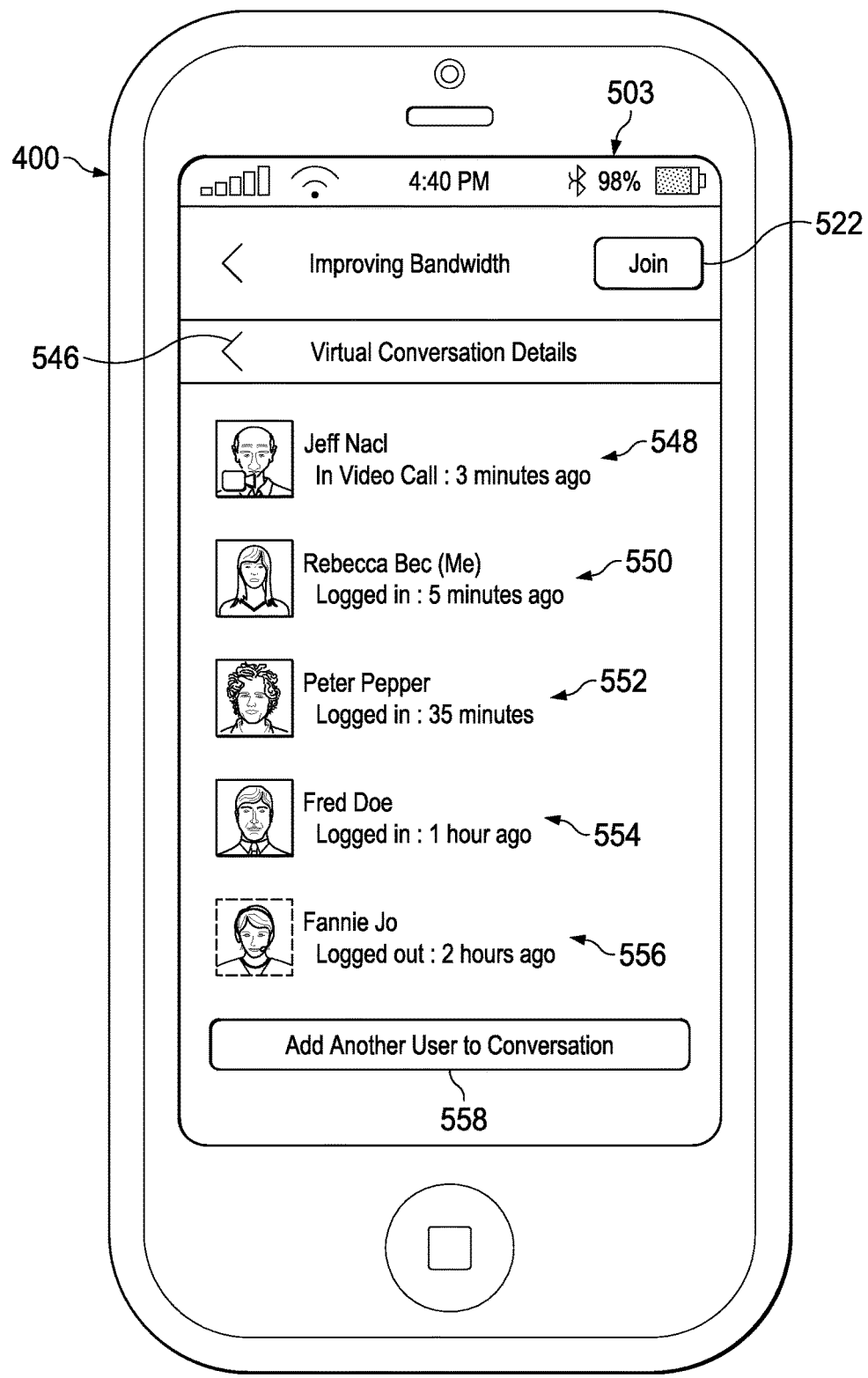
Figure 6A:
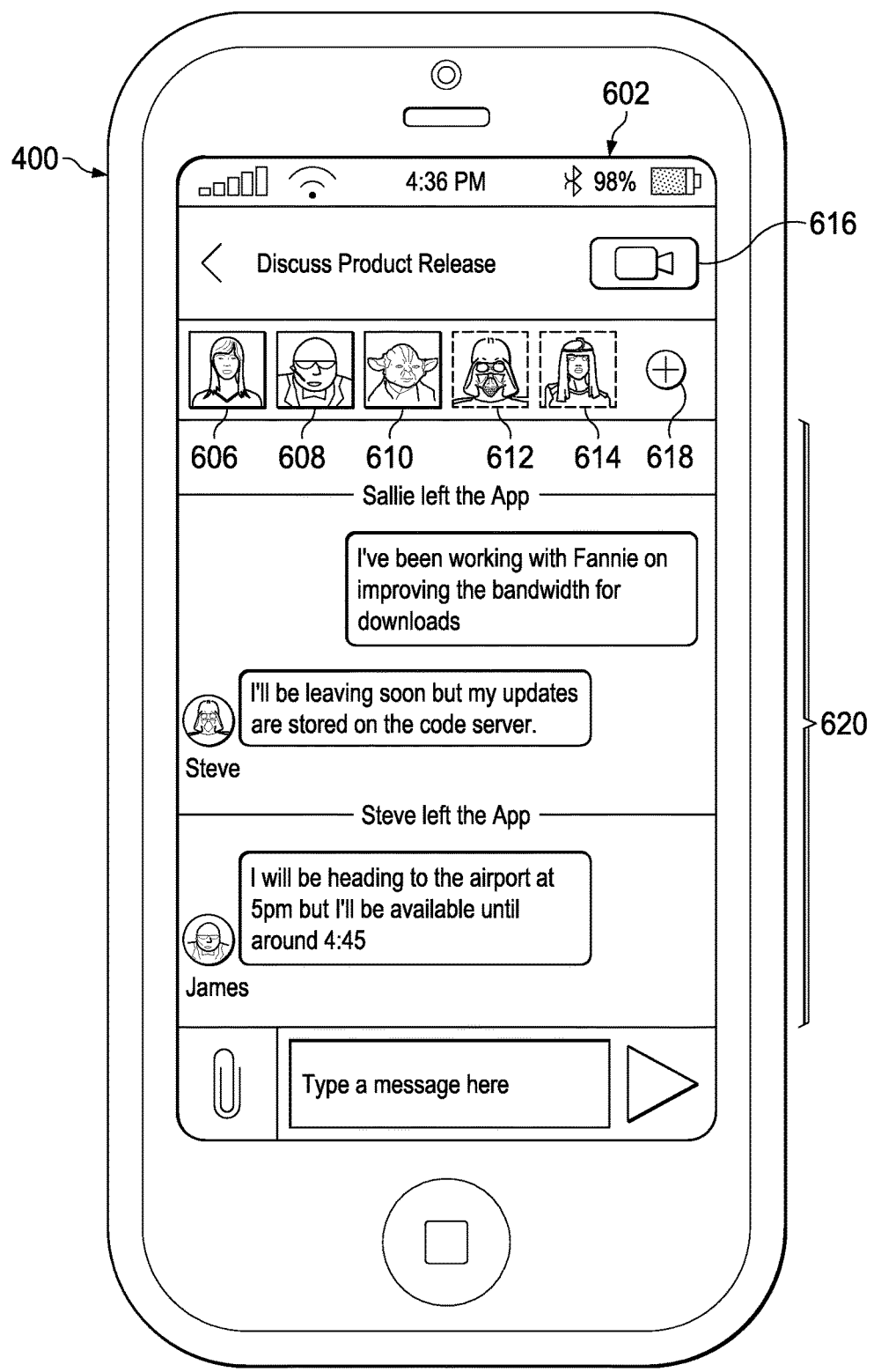

Turning to FIG. 5C, FIG. 5C illustrates interface 503. Interface 503 includes detailed information on elapsed time since the each endpoint (i.e., corresponding to user profiles associated with the virtual conversation) performed an action related to a communication session with the one or more servers and/or an action related to the virtual conversation. The interface 503 comprises interface buttons 546, 522, and 558; and components 548, 550, 552, 554, and 556. The components 548, 550, 552, 554, and 556 enable a user to review the activity of other users involved in the virtual conversation. In some virtual collaboration systems, users are unable to determine whom is present in a video call (or virtual meeting) without first joining it. In some cases, a user only wants to see a list of participants who have joined the call but does not want to join the call (e.g., because the user wants, prior to joining the video call, to check whether the presenter or a manager is present, etc.). The components 548, 550, 552, 554, and 556 advantageously provide a list of identifiers (e.g., graphical and textual) corresponding to each user involved in a virtual conversation and further illustrate (e.g., using visual effects) a measure of connectivity to the virtual conversation (e.g., whether the user is connected to a video call, whether the user is logged into the virtual meeting system). A user may utilize such data to determine whether to initiate a call and/or join an existing call within a virtual conversation.

The interface button 546 is operable to return to the interface 502 of FIG. 5A (e.g., returns to the last interface). The interface button 522 is operable to accept the request to initiate a video call (e.g., to join the call and initiate transmitting video and corresponding audio in the virtual conversation.) The interface button 558 is operable to generate a new window allowing the selection of one or more contacts (e.g., user profiles) to add to the virtual conversation. Each of the components 548, 550, 552, 554, and 556 corresponding to one of the user profiles associated with the meeting. Each of the components includes the same graphical identifier that was included in bar 506. In addition, each of the components 548, 550, 552, 554, and 556 includes a user profile identifier, indicia identifying an action (e.g., a most recent action) performed relative to a communication session and/or the virtual conversation "Improving bandwidth", and an elapsed time since the action was performed. In particular, component 548 includes: the user profile identifier "Jeff Nacl"; indicia identifying that a corresponding endpoint (i.e., endpoint 112g, endpoint ID 2) "Initiated Video Call" within the virtual conversation "Improving bandwidth"; indicia identifying that "3 minutes" have elapsed since the endpoint performed the action; and a graphical identifier comprising a live, streaming video and audio of the user captured by a camera and microphone of the corresponding endpoint. The component 550 includes: the user profile identifier "Rebecca Bec"; indicia identifying that a corresponding endpoint (i.e., endpoint 112f, endpoint ID 1) "Logged in" to a communication session (i.e., the action); indicia identifying that "5 minutes" have elapsed since the endpoint performed the action; and a graphical identifier comprising a still image retrieved from the user profile. In addition, because the endpoint 400 corresponds to the endpoint 112f (i.e., endpoint ID 1, which is associated with "Rebecca Bec"), component 550 includes indicia identifying "Me", which allows a user to quickly identify themselves in a list of other users. The components 552 and 554 include user profile identifiers, indicia, and graphical identifiers similar to those described for component 550. A difference is that the components 552 and 554 correspond to the user profile identifiers "Peter Pepper" (i.e., having logged in 35 minutes ago) and "Fred Doe" (i.e., having logged in 1 hour ago) respectively. In addition, each excludes the "Me" indicia. The component 556 includes: the user profile identifier "Fannie Jo"; indicia identifying that a corresponding endpoint (i.e., endpoint 112i, endpoint ID 4) "Logged out" of a communication session (i.e., the action); indicia identifying that "2 hours" have elapsed since the endpoint performed the action; and a graphical identifier comprising a still image retrieved from the user profile corresponding to "Fannie Jo". In this example, an endpoint corresponding to each of user profiles "Jeff Nacl", "Rebecca Bec", "Peter Pepper", and "Fred Doe" is presently connected to a communication session (e.g., by communication sessions 210b, 210a, 210c, and 210e in FIG. 2). The endpoint corresponding to the user profile "Fannie Jo" is not presently connected to a communication session (e.g., terminated the communication session 210d). In some examples, the determination of whether an endpoint is connected to a communication session is based on whether the endpoint is executing a graphical user interface application associated with the communication session (an application as illustrated in any of FIGS. 4A-C, 5A-G, 6A-B, 8A-C, 9A-B). For example, since each of the endpoints for user profiles "Jeff Nacl", "Rebecca Bec", "Peter Pepper", and "Fred Doe" are executing the graphical user interface application, each is determined to be presently connected to the communication session (e.g., due to execution of the application causing establishment of the communication session). Since the endpoint for user profile "Fannie Jo" is not executing the graphical user interface application (e.g., the application was closed or terminated on the user's endpoint), it is determined that the endpoint is not presently connected to a communication session. Although, "Fannie Jo" is logged out of the application (i.e., and is not in connected to a communication session), the corresponding graphical identifier is still included in the bar 506 (FIGS. 5A and 5B) and in the interface 503 (FIG. 5C). In addition, any content that the user submitted to the virtual conversation persists even after the user is logged out (e.g., message 509

FIG. 5A). Thus, users involved in the virtual meeting can asynchronously accessed any content in the virtual conversation.

Figure 5D:
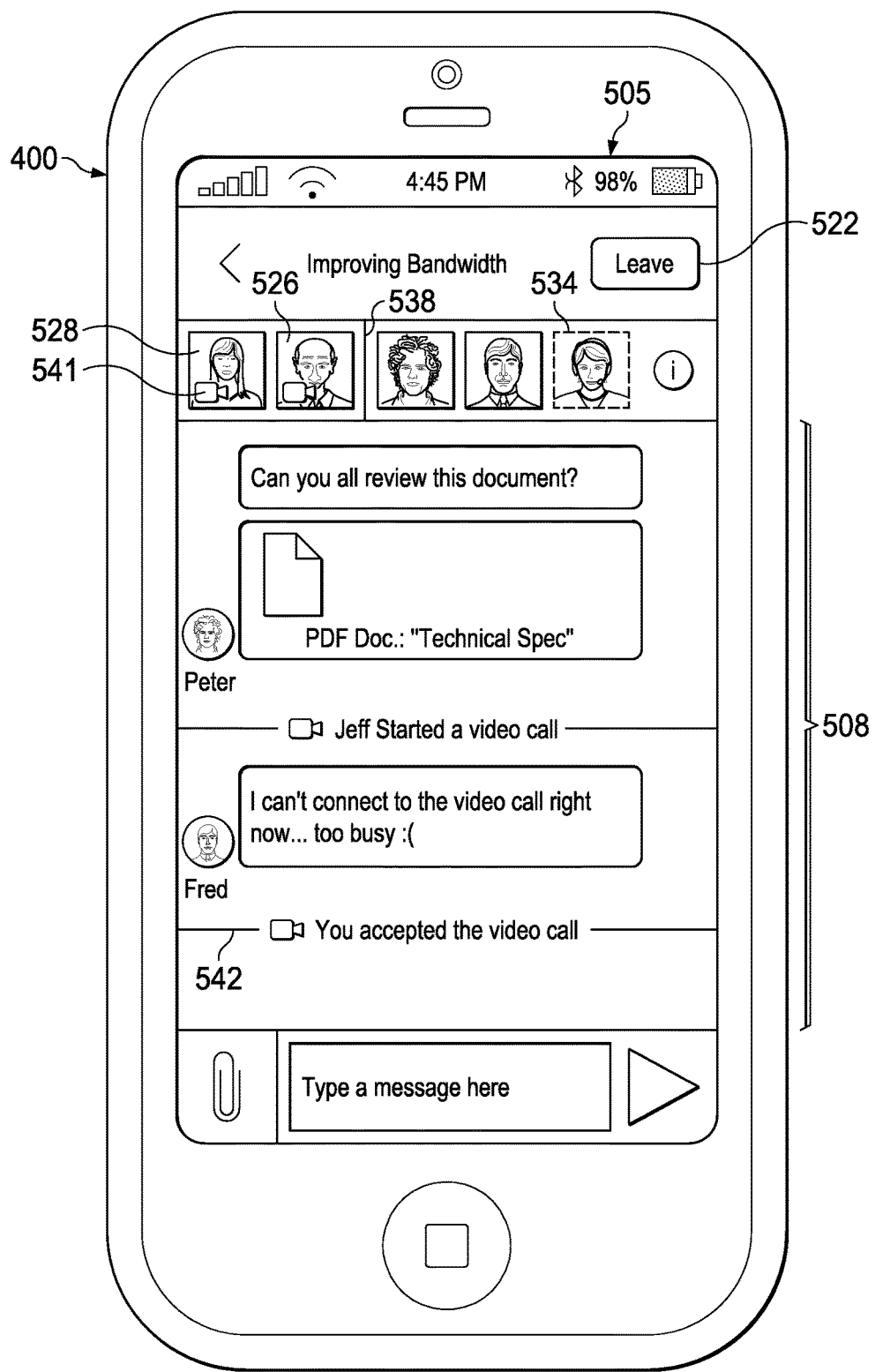

Upon receiving a selection to join an existing video call (e.g., at button 522 in either interface 503 (FIG. 5C) or interface 502 (FIG. 5A)), an endpoint joins the video call (e.g., accepts a request to join a video call). Turning to FIG. 5D, FIG. 5D illustrates interface 505 which may be displayed in response to the endpoint 400 receiving an input effective to join the video call in the virtual meeting "Improving Bandwidth". The graphical identifier 528 for "Rebecca Bec" has been updated (i.e., based on joining the video call) in interface 505 relative to the interface bar as shown in FIG. 5B. For example, the graphical identifier 528 changes location and visual effect relative to FIG. 5B. The graphical identifier 528 has moved from the right side of the vertical bar 538 to the left side of the vertical bar (e.g. is now grouped with the identifier 526). The vertical bar is a visual delineator for different portions for the interface bar (e.g., where the left side includes only users that have joined the call and there right side includes user that have not joined the call). In addition, the graphical identifier 528 has changed from being a full-color, still image to being a streaming video of the user (e.g., captured live by a camera coupled to the user's endpoint). An icon 541 has been applied to the graphical identifier 528, which further indicates that the graphical identifier is live video. In addition to changes in the interface bar, the communication data 508 is updated to include a log record that identifies that the endpoint accepted the video call. Such data may be stored in communication data records 208 in database 204 (FIG. 2). Since the user is not connected to the video call, the button 522 is updated to include the text "Leave" and is operable to disconnect the user "Rebecca" (i.e., endpoint 400) from the video call.

In this example, the interface bar is customized for each user by placing their graphical identifier as the leftmost identifier in its grouping. For example, since endpoint 400 corresponds to the user profile "Rebecca Bec", the graphical identifier 528 is placed to the left of all other graphical identifiers that are left of the vertical bar 538. This feature allows the user to view their own graphical identifier while allowing them to easily distinguish their own graphical identifier from other identifiers in the interface bar (e.g., a user can remember that, in a particular grouping in which my identifier is located, the left most identifier is always me). In other examples, the interface bar is not customized for each user. For example, each user may be provided the exact same graphical identifiers having the same order and visual effects.

Subsequent to "Rebecca" joining the video call (as illustrated in FIG. 5D), the user "Fannie" (i.e., corresponding to graphical identifier 534) establishes a communication to the one or more servers (e.g., logs into the application). Turning to FIG. 5E, FIG. 5E illustrates interface bar 506 as it may be generated (by endpoint 400) based on the user "Fannie" logging into the application. The one or more servers may establish a connection to the endpoint corresponding to "Fannie" (e.g., based on the endpoint executing an application that establishes a connection to the one or more servers). Thus, the servers may detect a change in connectivity to a communication session for the user "Fannie" (e.g., based on detecting a change from not connection to connected to the communication session) and update the graphical identifier 534 based on detecting the change. The graphical identifier 534 is updated from being a gray scale image to being a full color image (e.g., the color profile being a visual effect). In addition, the graphical identifier 534 is moved from to the left of all of the other users that are in the app (but not in the call). Since the order of the users (on each side of the vertical bar 538) is sorted based on elapsed time, graphical identifier 534 the user "Fannie" is moved to the left since she made the most recent action relative to the application (i.e., when compared to the other users 530 and 532, the elapsed time since Fannie logged into the app is the shortest).

Subsequent to "Fannie" establishing a communication session (as illustrated in FIG. 5E), the user "Fannie" (i.e., corresponding to graphical identifier 534) joins the video call. Turning to FIG. 5F, FIG. 5F illustrates interface bar 506 as it may be generated (by endpoint 400) based on the user "Fannie" joining the video call in the virtual meeting "Improving Bandwidth". An endpoint corresponding to the user "Fannie" may receive an input effective to join the video call and transmit data corresponding to the input to the servers. Thus, the servers may detect a change, for the user "Fannie", in connectivity to the communication data stream (e.g., based on detecting a change from, not connected to the video call, to connected to the video call) and update the graphical identifier 534 based on detecting the change. The graphical identifier 534 is updated from being a full color image (in FIG. 5E) to being a live streaming video (in FIG. 5F). In addition, graphical identifier 534 has moved from the right side of the vertical bar 538 to the left side of the vertical bar (e.g. is now grouped with the identifiers 526 and 528). An elapsed time since "Fannie" connected to the video call is shorter than that of each of the other users "Rebecca" (graphical identifier 528) and "Jeff" (graphical identifier 526). Thus, graphical identifier 534 may be placed to the left of both graphical identifiers 528 and 526. However, because, in this case, the interface bar is customized for each user by placing their graphical identifier as the leftmost identifier within a corresponding grouping, the graphical identifier 528 is placed to the far left (i.e. because endpoint 400 correspond to the user "Rebecca"). The remaining two graphical identifiers 534 and 526 are then sorted based on the elapsed time. Since the elapsed time for "Fannie" is less than that of "Jeff" (graphical identifier 526), the graphical identifier 534 is placed between the graphical identifiers 526 and 528 (e.g., identifier 534 is placed to the right of identifier 528 and to the left of identifier 526).

Subsequent to "Fannie" joins the video call (as illustrated in FIG. 5F), the user "Jeff" (i.e., corresponding to graphical identifier 526) leaves the video call. Turning to FIG. 5G, FIG. 5G illustrates interface bar 506 as it may be generated (by endpoint 400) based on the user "Jeff" terminating a connection to the video call in the virtual meeting "Improving Bandwidth" (i.e., but remaining connected to a communication session). An endpoint corresponding to the user "Jeff" may receive an input effective to terminate the connection to the video call (i.e. leave the call) and transmit data corresponding to the selection to the servers. The servers may detect, for the user "Jeff", a change in connectivity to the communication data stream (e.g., based on detecting a change from not connected to the video call to connected to the video call). The graphical identifier 526 is updated from being a live streaming video (in FIG. 5F) to being a (full color) still image (in FIG. 5G). In addition, graphical identifier 526 has moved from the left side of the vertical bar 538 to the right side of the vertical bar (e.g. is now grouped with the identifiers 530 and 532). Although the endpoint corresponding to the user "Jeff" has recently transitioned out of the video call (i.e., his was the most recent endpoint to do so), an elapsed time that the endpoint has been connected to a communication session to the one or more servers (e.g. via an application) lies between that of the users "Peter" (graphical identifier 530) and "Fred" (graphical identifier 532). Thus, the graphical identifier 526 is placed between the graphical identifier 530 and 532 (e.g., identifier 526 is placed to the right of identifier 530 and to the left of identifier 532).

Figure 6B:
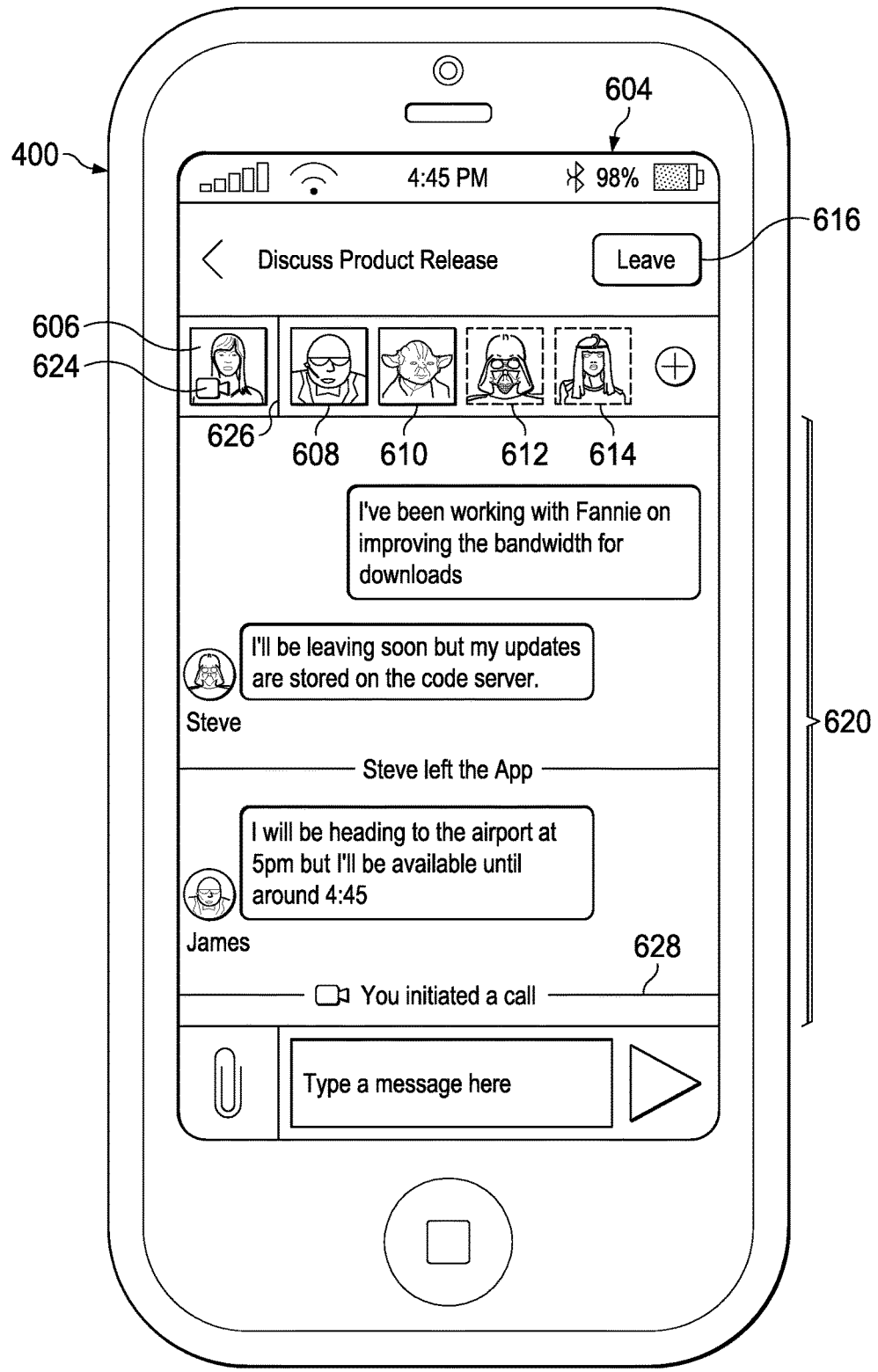

FIGS. 6A and 6B illustrate exemplary user interface graphics associated with a virtual conversation titled "Discuss Product Release" (i.e., listing 414e in FIG. 4C and conversation record 206b in FIG. 2). For example, when the endpoint 400 receives a selection of the listing 414e (FIG. 4C), the endpoint generates and renders interface 602 as shown in FIG. 6A. Turning to FIG. 6A, FIG. 6A illustrates interface 602 comprising, among other things, interface button 616, communication data 620, and an interface bar comprising a plurality of graphical identifiers 606, 608, 610, 612, in 614. The graphical identifiers 606, 608, 610, 612, and 614 respectively correspond to user profile identifiers "Rebecca Bec" (i.e., endpoint identifier 1), "James" (i.e., endpoint identifier 6), "Sonny" (i.e., endpoint identifier 7), "Steve" (i.e., endpoint identifier 8), and "Sallie" (i.e., endpoint identifier 9).

The communication data 620 corresponds to the data retrieved by the one or more servers 202 in FIG. 2 from database 204 (i.e., communications data records 208). In this example, the communications data comprises not only log entries but also messages from the plurality of users involved in the virtual conversation. One log entry identifies that Sally left the application. Correspondingly, in the interface bar, the identifier 614 is rendered having gray scale values (i.e., and not in full color). The visual effect of gray scale indicates, to other users, that user Sally is not presently connected to the application. The communication data 620 also includes a message from "Rebecca" and a message from Steve. A log entry identifies that Steve logged out of the application (i.e., after submitting the message). As a result, Steve's graphical identifier 612 is also rendered having gray scale values.

Within the interface bar, an order in which the graphical identifiers 612 and 614 are placed is based on the order in which the corresponding users "Steve" and "Sallie" logged out of the application (e.g., disconnected from a communication channel to the one or more servers). Since "Steve" left after "Sallie", Steve's graphical identifier 612 is located to the left of Sally's graphical identifier 614. Thus, for all of the users who currently logged out of the application, the graphical identifiers are ordered from left to right, wherein the leftmost graphical identifiers correspond to the user who most recently left the application, continuing in reverse chronology of users who left the application. The two graphical identifiers 612 and 614 are a first grouping of graphical identifiers corresponding to endpoints that are currently not logged into the application. Because the interface bar is customized to the user whose application the interface being rendered on, the interface the graphical identifier 606 for Rebecca is always shown as the leftmost user (i.e., as was the case for FIGS. 5A-C). Together, the remaining two graphical identifiers 608 and 610 are a second grouping of graphical identifiers corresponding to endpoints that are currently logged into the application. The first grouping is sorted separately from the second grouping. The graphical identifiers 608 and 610 correspond to user identifiers "James" and "Sonny". Within the interface bar, an order in which the graphical identifiers 608 and 610 (i.e., the second group) are placed, is based on the order in which the corresponding users "James" and "Sonny" logged into the application. In this case, "James" logged into the application more recently than "Sonny" and thus graphical identifiers 608 shown to the left of graphical identifier 610.

Figure 7:
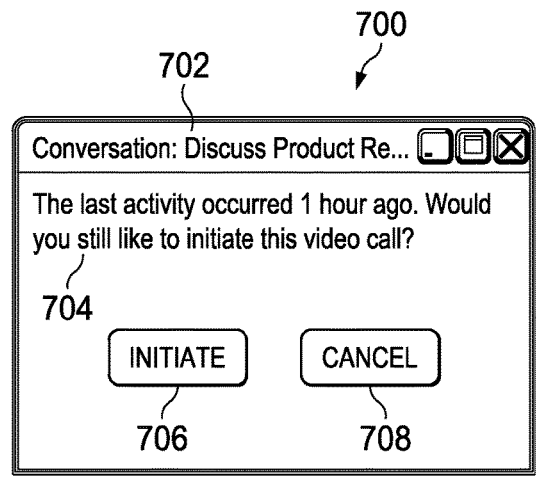

Comparing the interface 602 of FIG. 6A to interface 502 FIG. 5A, reveals that, in FIG. 5A, a video call had already been initiated within the conversation before the user Rebecca selected (414b) to view the content of the meeting while, in FIG. 6A, no video call has been initiated at the point at which user Rebecca enters the conversation. Correspondingly, interface 502 included an option to "Join" the video call (i.e., button 522), while interface 602 includes an option to initiate a video call within the communication data stream (e.g., button 616). In particular, the button 616 is operable to generate a request to initiate a voice call within the virtual conversation titled "Discuss Product Release". In some examples, when the device 400 receives an input at button 616, the call is immediately initiated and the interface on device 400 is advanced to interface 604 of FIG. 6B. However, in other examples, instead of immediately initiating the call within the virtual conversation, the endpoints and/or the one or more servers process data corresponding to each of the profiles involved in the virtual conversation to determine whether to initiate the call. For example, such a determination may include determining whether to initiate the video call based on the elapsed time since endpoints (corresponding to each of the plurality of profiles involved in the call) performed an action related to a communication session. Turning to FIG. 7, FIG. 7 illustrates an exemplary notification 700 that is generated based on a determination of whether to initiate the video call. The notification 700 is a window comprising a title 702, indicia 704, and buttons 706 and 708. The title 702 identifies the conversation from which the notification was generated (in this case "Discuss Product Release"). The indicia 704 identify that the last activity occurred within the conversation one hour ago and asks the user whether they would like to proceed to initiate video call. The interface button 706 is effective to proceed to initiate the video call. The interface button 708 is effective to cancel the request to initiate the video call. For example, when the device 400 receives an input at button 706, the call is initiated and the interface on device 400 is advanced to interface 604 of FIG. 6B. In this example, when the device 400 receives an input at button 708, the call is not initiated and the interface on device 400 is advanced to interface 602 of FIG. 6A.

Turning to FIG. 6B, FIG. 6B illustrates interface bar 604 as it may be generated (by endpoint 400) based on the user "Rebecca" initiating a video call within the virtual meeting. The communication data 620 is updated to include a log record 628 identifying that the user Rebecca initiated the video call. One or more servers may detect, for the user "Rebecca", a change in connectivity to the communication data stream (e.g., based on detecting a change from, not connected to the video call, to connected to the video call) and update the graphical identifier 606 based on detecting the change. The graphical identifier 606 is updated from being a full color image (in FIG. 6A) to being a live streaming video (in FIG. 6B). In addition, the interface bar has been updated to include a vertical bar 626. The graphical identifier 606 has moved to the left side of the vertical bar 626. The remaining two graphical identifiers 608, 610, 612, and 614 remain on the right of the vertical bar and maintain that sorting as described with respect to FIG. 6A. Because the user "Rebecca" is the only user connected to the video call only her graphical identifier 606 is on the left side of the vertical bar 626. Because the user "Rebecca" is connected to the call, the button 616 is updated to include the text "Leave" and, in the interface 604, is operable to terminate the endpoint's (i.e. endpoint 400) connection to the call. As other users join and/or leave the video call, their graphical identifiers can be updated as described with respect to any of FIGS. 5A-D.

Figure 9A:
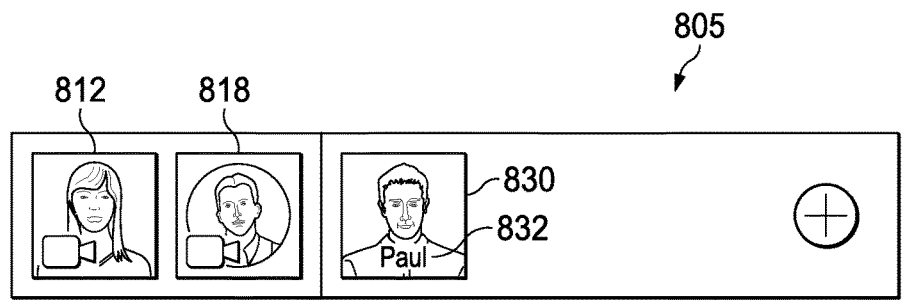
Figure 9B:
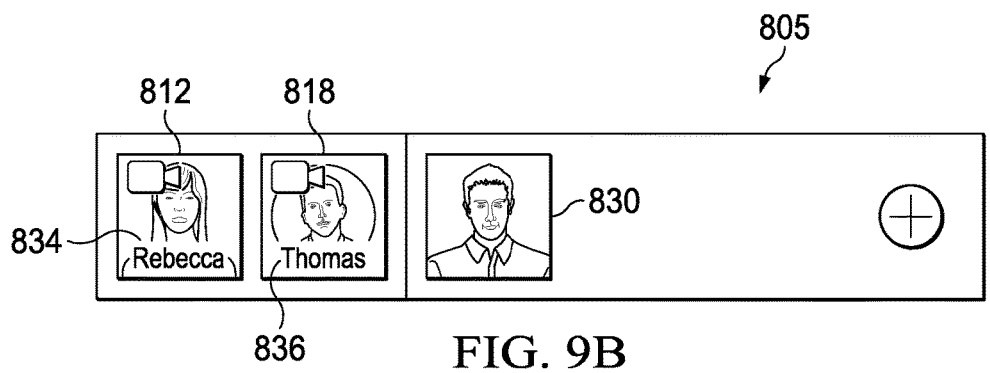
Figure 8B:
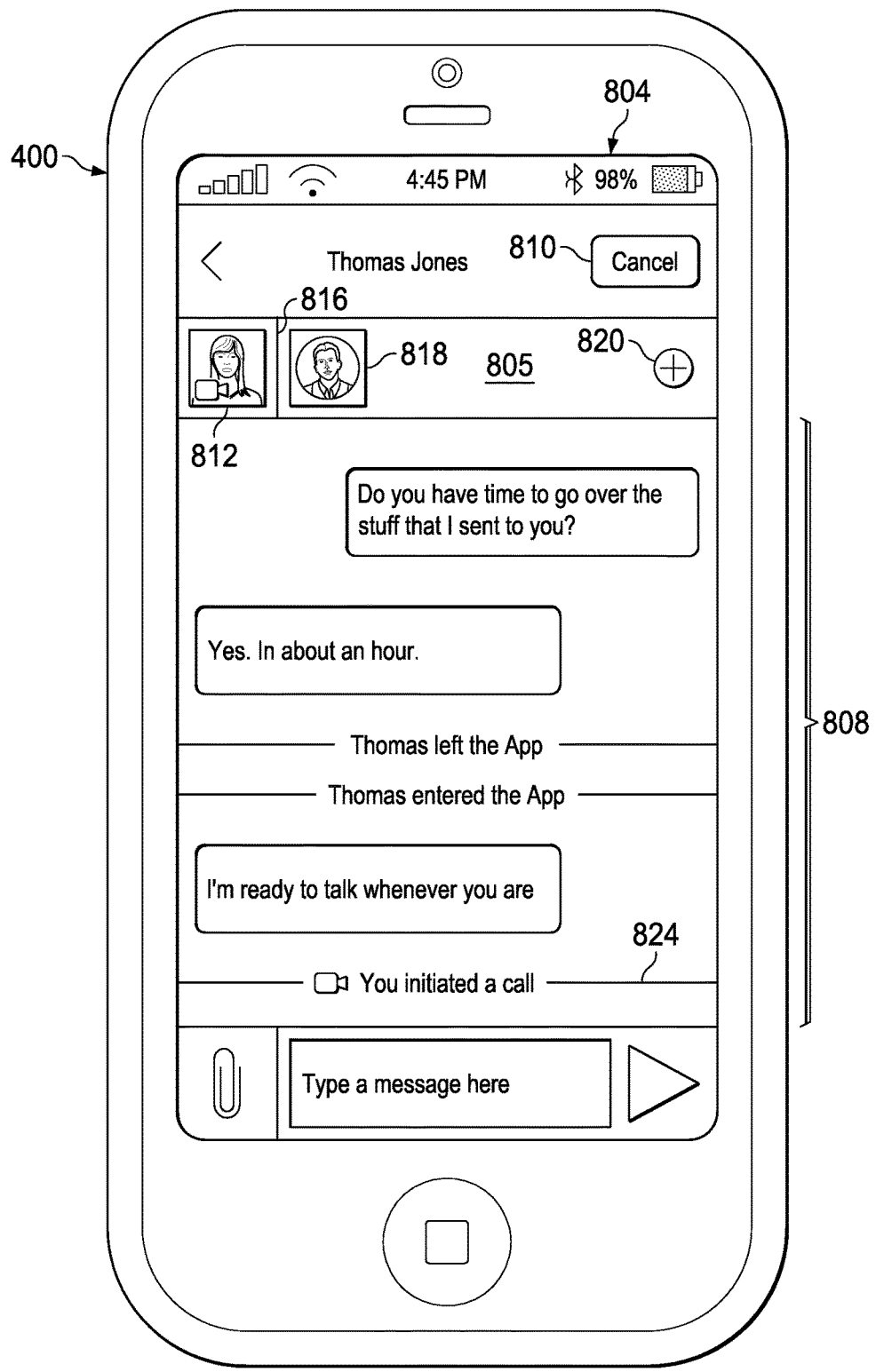
Figure 8C:
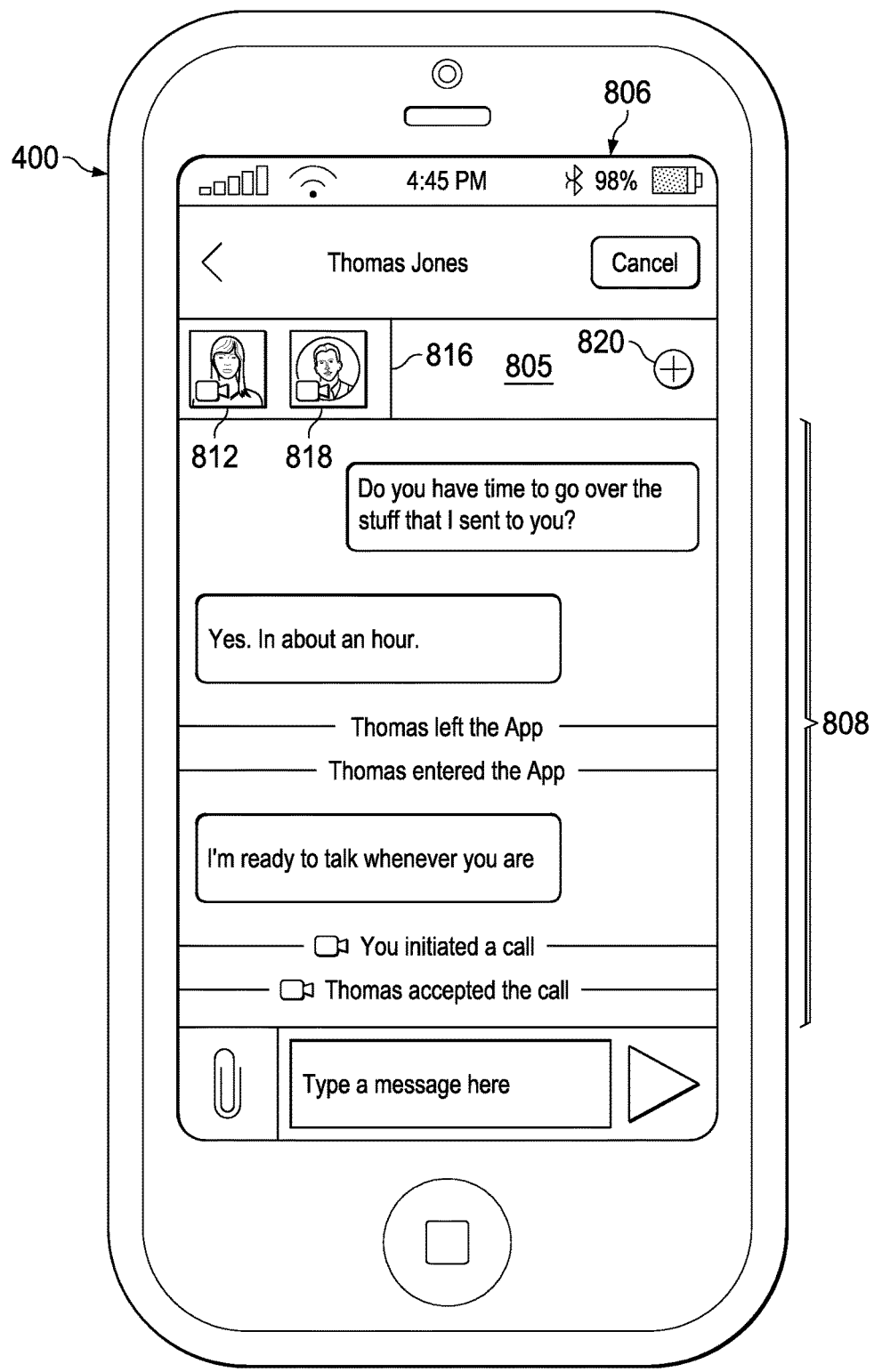

FIGS. 8A, 8B, and 8C illustrate exemplary user interface graphics associated with a conversation involving only two users. The user interface graphics of FIGS. 8A, 8B, and 8C correspond to those generated in the context of the conversation between the users Rebecca and Thomas Jones (i.e., listing 414d FIG. 4C). For example, when the endpoint 400 receives a selection of the listing 414d, the endpoint generates and renders interface 802 as shown in FIG. 8A. Turning to FIG. 8A, the interface 802 includes, among other things, communication data 808, and button 810. The communication data 808 includes messages and log data corresponding to communications and actions between the users Rebecca and Thomas Jones. The interface 802 does not include an interface bar (e.g., an interface bar like 506 in FIGS. 5A-C). However, the user may select the title bar (i.e., the title bar contains the text "Thomas Jones") to cause the endpoint to generate a display of an interface bar. The resulting interface bar may operate in a manner similar to that described with respect to FIGS. 6A-B except that it only includes graphical identifiers corresponding to the users Rebecca and Thomas Jones. In another example, the interface bar may be displayed in interface 802 by default. The button 810 is operable is operable to generate a request to initiate a voice call within the virtual conversation (i.e. to initiate a call to the user Thomas Jones). The button 810 may operate in a manner similar to that described with respect to button 616 (FIG. 6A). When the endpoint receives a selection at the button, the call is initiated (e.g., immediately or after displaying a notification) and the interface on device 400 is advanced to interface 804 of FIG. 8B. Turning to FIG. 8B, interface 804 includes an interface bar 805. The interface bar includes a vertical bar 816 and two graphical identifiers 812 and 818, which correspond to the users Rebecca and Thomas, respectively. Because Rebecca is the only one of the two users connected to the video call, the graphical identifier 812 is live video of the user Rebecca, while the graphical identifier 818 is still an image of the user Thomas (e.g., retrieved from the user profile and/or from an camera coupled to Thomas' endpoint). Because the user "Rebecca" is connected to the call, the button 810 is updated to include the text "Cancel" and, in the interface 804, is operable to terminate the endpoint's (i.e. endpoint 400) connection to the call. The communication data 808 is updated to include a log record 824 identifying that the user Rebecca initiated the video call. Subsequent to Rebecca initiating the call, the user Thomas joins the video call. Turning to FIG. 8C, FIG. 8C illustrates interface 806 as it may be generated (by endpoint 400) based on the user Thomas joining the video call. The graphic identifier 818 is moved from the right side of the vertical bar 816 to the left side of the bar based on the user Thomas joining the call. In addition, the graphical identifier 818 is updated from being a full color image (in FIG. 8B) to being a live streaming video (in FIG. 8C). An ordering of the graphical identifiers may operate in a manner similar to that described with respect to FIGS. 5A-G. The interface 806 also includes a button 820; the button 820 is operable to add a guest to the virtual conversation. A guest is a user profile that is not persistently associated with the virtual conversation (e.g., is not stored in the conversation record 206) and is only temporarily associated with the virtual conversation (e.g., the guest is granted access to the virtual conversation only until the guest logs out of the app, upon the next login the guest will not be granted access to the virtual conversation, the guest is granted access to the virtual conversation until a specific video call ends). For example, a guest user may be added to a virtual conversation to address a temporary need within the discussion, but is not a permanent member of the discussion. When the endpoint 400 receives a selection received at 820, the endpoint generates a new window enabling the selection of one of the user profiles to add to the virtual conversation. When the guest has been added, the endpoint 400 may generate an interface bar 805 as illustrated in FIG. 9A. FIG. 9A illustrates the interface bar 805 including a new graphical identifier 830 corresponding to a guest. In this example, graphical identifier 830 includes a visual effect of displaying the guests name overlaid on a still image corresponding to the user. In contrast, the graphical identifiers 812 and 818 are unchanged with respect to FIG. 8C. Each of the users Rebecca and Thomas may be transmitted an interface bar similar to that in FIG. 9A (i.e., where the guest is identified by name). Such an interface bar provides persistent/permanent users with additional information about a guest with which they may be unfamiliar. In contrast, the guest may be transmitted an interface bar similar to that in FIG. 9B. FIG. 9B illustrates the interface bar 805 in a state where each of graphical identifiers 812 and 818 includes a visual effect of displaying the corresponding users name overlaid on the graphical identifiers. In contrast, the graphical identifier 830 does not include the guest's name overlaid on the graphical identifiers. Such an interface bar provides guest users with additional information about the other users in the virtual conversation with which the guest may be unfamiliar.

The examples of an interface bar in FIGS. 4A, 4B, 4C, 5A, 5B, 5C, 5D, 5E, 5F, 5G, 6A, 6B, 8A, 8B, 8C, 9A, and 9B are illustrative examples and do not limit the scope of the present disclosure. In several of the above examples, for graphical identifiers on the left side of the vertical bar 538 in the interface bar 506, an elapsed time is measured relative to when a corresponding endpoint joined the video call; and for graphical identifiers on the right side of the vertical bar 538 in the interface bar 506, an elapsed time is measured relative to when a corresponding endpoint logged into the communication system 100 (e.g., established a communication session to the one or more servers 202). In other examples, the elapsed time may be measured relative to any activity related to a communication session and/or a virtual conversation. In above examples, the interface bar 506 is horizontally oriented. However, in other examples, the interface bar 506 is vertically oriented. In such examples, a horizontal bar may be used to delineate between two portions of the interface bar. Other visual delineations include justifying the graphical identifiers on one of two sides to create a distinction between different identifiers. In addition, some of the examples relate to one or more servers (e.g., 202) performing actions and making determinations. However, endpoints may also perform such actions and make such determinations. In addition, the visual effects applied to graphical identifiers are not limited to gray scale, full color, applying a textual overlay, or steaming video. A visual effect is inclusive of, for example, 3D layering effects (e.g., where some graphical identifiers appear to be elevated with respect to other graphical identifiers), scrolling effects (e.g., maintaining graphical identifiers corresponding to active users while allowing a list of inactive users to scroll underneath the list of active users), or any other visual effect usable to distinguish between two or more graphical user identifiers. In some examples, the list of users may be too long to display all of the graphical identifiers all at once. In such cases, an interface bar (as disclosed herein) allows scrolling through of the list identifiers while only viewing a subset of the list at a time. For example, some of the graphical identifiers an endpoint may receive, at an interface bar, a scroll command causing the interface bar to advance (e.g., slide) some of the graphical identifiers off screen while bringing others of the graphical identifiers on to the screen. Other features may include enabling a tap-and-hold (e.g., tap and hold for 3 seconds as opposed to a "click" which is a tap and quick release) to expose an interface bar. For example, in the example of FIG. 4C, when the endpoint 400 receives a tap-and-hold input at component 414b, the endpoint may generate interface bar 506 (FIG. 5A) and overlay the interface bar 506 on the component 414b (e.g., while remaining on interface 405 (FIG. 4C) and not advancing to interface 502 (FIG. 5A). In other examples, tap-and-hold input at a graphical identifiers is operable to initiate a call or a message to the corresponding user. For example, when the endpoint 400 receives a tap-and-hold input at graphical identifier 608 in FIG. 6A, the endpoint may initiate a video call to the endpoint of the corresponding user. In some examples, such functionality can be activated even while an endpoint is actively engaged in another video call in a virtual meeting (e.g., by leaving the first call to join the second). The user may be automatically reconnected to the video call in the virtual meeting upon ending the call with the corresponding user.

FIG. 10 is a simplified block diagram illustrating one possible example of infrastructure associated with communication system 100. Each of endpoints 112a-e are provisioned with a respective graphical processing module 82a-e (e.g., a GPU), a respective processor 84a-e, a respective memory element 86a-e, a respective virtual meeting module 90a-e (e.g., a virtual meeting application), a respective Meeting Place module 92a-e, and a respective network interface 88a-e, which includes a respective receiving module and a respective transmitting module for exchanging data (e.g., for exchanging packets in a network environment). Endpoint 112e also includes a telephony interface 94 for communicating with telephony network 122. Additionally, FIG. 10 illustrates an example implementation of MCSs/MCC 144 that is similarly provisioned with a graphical processing module 82f, a processor 84f, and a memory element 86f. Thought not explicitly illustrated in FIG. 10 (only for the purpose of clarity of the Figure), Each of endpoints 112f-n are provisioned with a respective graphical processing module 82f-n (e.g., a GPU), a respective processor 84f-n, a respective memory element 86f-n, a respective virtual meeting module 90f-n (e.g., a virtual meeting application), a respective Meeting Place module 92f-n, and a respective network interface 88a-e, which includes a respective receiving module and a respective transmitting module for exchanging data (e.g., for exchanging packets in a network environment).

In one example implementation, each endpoint 112a-e and/or MCSs/MCC 144 includes software (e.g., as part of graphical processing modules 82a-f) to achieve or to support the graphical identifier generation functions, as outlined herein in this document. In other embodiments, this feature may be provided externally to any of the aforementioned elements, or included in some other network element to achieve this intended functionality. Alternatively, several elements may include software (or reciprocating software) that can coordinate in order to achieve the operations, as outlined herein. In still other embodiments, any of the devices of the Figures may include any suitable algorithms, hardware, software, components, modules, interfaces, or objects that facilitate these graphical identifier generation operations.

It is imperative to note that FIG. 10 is indicative of just one, of the multitude, of example implementations of communication system 100. Any of the modules or elements within endpoints 112a-e and/or MCSs/MCC 144 may readily be replaced, substituted, or eliminated based on particular needs. Furthermore, although described with reference to particular scenarios, where a given module (e.g., virtual meeting modules 90a-e, Meeting Place modules 92a-e, graphical processing modules 82a-f, etc.) is provided within endpoints 112a-e or MCSs/MCC 144, any one or more of these elements can be provided externally, or consolidated and/or combined in any suitable fashion. In certain instances, certain elements may be provided in a single proprietary module, device, unit, etc. in order to achieve the teachings of the present disclosure.

Endpoints 112a-n are representative of any type of client or user wishing to participate in a meeting session in communication system 100 (e.g., or in any other virtual platform or online platform). Furthermore, endpoints 112a-n can be associated with individuals, clients, customers, or end users wishing to participate in a meeting session in communication system 100 via some network. The term 'endpoint' is inclusive of devices used to initiate a communication, such as a computer, a personal digital assistant (PDA), a laptop or electronic notebook, a cellular telephone of any kind (e.g., an IPHONE, a BLACKBERRY, a GOOGLE DROID), an IP phone, a tablet (e.g., an IPAD), or any other device, component, element, or object capable of initiating voice, audio, video, media, and/or data exchanges within communication system 100. Endpoints 112a-n may also be inclusive of a suitable interface to the human user, such as a microphone, a display, or a keyboard or other terminal equipment. Endpoints 112a-n may also be any device that seeks to initiate a communication on behalf of another entity or element, such as a program, a proprietary conferencing device, a database, or any other component, device, element, or object capable of initiating an exchange within communication system 100. Data, as used herein in this document, refers to any type of numeric, voice, video, media, or script data, or any type of source or object code, or any other suitable information in any appropriate format that may be communicated from one point to another.

MCSs/MCC 144 and web servers 132 are network elements that manage (or that cooperate with each other in order to manage) aspects of a meeting session. As used herein in this Specification, the term 'network element' is meant to encompass any type of servers (e.g., a video server, a web server, etc.), routers, switches, gateways, bridges, load balancers, firewalls, inline service nodes, proxies, network appliances, processors, modules, or any other suitable device, component, element, or object operable to exchange information in a network environment. This network element may include any suitable hardware, software, components, modules, interfaces, or objects that facilitate the operations thereof. This may be inclusive of appropriate algorithms and communication protocols that allow for the effective exchange (reception and/or transmission) of data or information. In one particular example, MCSs/MCC 144 and web servers 132 are servers that can interact with each other via the networks of FIG. 1 and/or FIG. 2.

Intranet 120, telephony network 122, and Internet 124 represent a series of points or nodes of interconnected communication paths for receiving and transmitting packets of information that propagate through communication system 100. These networks may offer connectivity to any of the devices or endpoints of FIG. 1. Moreover, Intranet 120, telephony network 122, and Internet 124 offer a communicative interface between sites (and/or participants, rooms, etc.) and may be any local area network (LAN), wireless LAN (WLAN), metropolitan area network (MAN), wide area network (WAN), extranet, Intranet, virtual private network (VPN), virtual LAN (VLAN), or any other appropriate architecture or system that facilitates communications in a network environment.

Intranet 120, telephony network 122, and Internet 124 can support a transmission control protocol (TCP)/IP, or a user datagram protocol (UDP)/IP in particular embodiments of the present disclosure; however, Intranet 120, telephony network 122, and Internet 124 may alternatively implement any other suitable communication protocol for transmitting and receiving data packets within communication system 100. Note also that Intranet 120, telephony network 122, and Internet 124 can accommodate any number of ancillary activities, which can accompany a meeting session. This network connectivity can facilitate all informational exchanges (e.g., notes, virtual whiteboards, presentations (such as POWERPOINT), e-mailing, word-processing applications, etc.). Along similar reasoning, Intranet 120, telephony network 122, and Internet 124 can foster all such communications and, further, be replaced by any suitable network components for facilitating the propagation of data between participants in a conferencing session.

It should also be noted that endpoints 112a-f and MCSs/MCC 144 may share (or coordinate) certain processing operations. Using a similar rationale, their respective memory elements may store, maintain, and/or update data in any number of possible manners. Additionally, any of the illustrated memory elements or processors may be removed, or otherwise consolidated such that a single processor and a single memory location is responsible for certain activities associated with operations as disclosed herein. In a general sense, the arrangement depicted in FIG. 10 may be more logical in its representations, whereas a physical architecture may include various permutations/combinations/hybrids of these elements.

Note that in certain example implementations, the graphical identifier generation functions outlined herein may be implemented by logic encoded in one or more tangible media (e.g., embedded logic provided in an application specific integrated circuit (ASIC), digital signal processor (DSP) instructions, software (potentially inclusive of object code and source code) to be executed by a processor, or other similar machine, etc.). In some of these instances, a memory element (as shown in FIG. 10) can store data used for the operations described herein. This includes the memory element being able to store software, logic, code, or processor instructions that can be executed to carry out the activities described in this Specification. A processor can execute any type of instructions associated with the data to achieve the operations detailed herein in this Specification. In one example, the processor (as shown in FIG. 10) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable ROM (EEPROM)) or an ASIC that includes digital logic, software, code, electronic instructions, or any suitable combination thereof.

In one example implementation, graphical processing module 82a-f includes software in order to achieve the graphical identifier generation functions outlined herein. These activities can be facilitated by MCSs/MCC 144 and/or the various endpoints 112a-n. MCSs/MCC 144 and/or endpoints 112a-n can include memory elements for storing information to be used in achieving the intelligent graphical identifier generation functions, as outlined herein. Additionally, MCSs/MCC 144 and/or endpoints 112a-f may include a processor that can execute software or an algorithm to perform the graphical identifier generation controls, as discussed in this Specification. These devices may further keep information in any suitable memory element (random access memory (RAM), ROM, EPROM, EEPROM, ASIC, etc.), software, hardware, or in any other suitable component, device, element, or object where appropriate and based on particular needs. Any possible memory items (e.g., database, table, cache, etc.) should be construed as being encompassed within the broad term 'memory element.' Similarly, any of the potential processing elements, modules, and machines described in this Specification should be construed as being encompassed within the broad term 'processor.'

Note that in certain example implementations, the graphical identifier generation functions outlined herein may be implemented by logic encoded in one or more tangible media (e.g., embedded logic provided in an application specific integrated circuit (ASIC), digital signal processor (DSP) instructions, software (potentially inclusive of object code and source code) to be executed by a processor, or other similar machine, etc.). In some of these instances, a memory element (as shown in FIG. 10) can store data used for the operations described herein. This includes the memory element being able to store software, logic, code, or processor instructions that can be executed to carry out the activities described in this Specification. A processor can execute any type of instructions associated with the data to achieve the operations detailed herein in this Specification. In one example, the processor (as shown in FIG. 10) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable ROM (EEPROM)) or an ASIC that includes digital logic, software, code, electronic instructions, or any suitable combination thereof.

In one example implementation, each of graphical processing modules 82a-f includes software in order to achieve the graphical identifier generation functions outlined herein. These activities can be facilitated by MCSs/MCC 144 and/or the various endpoints 112a-f. MCSs/MCC 144 and/or endpoints 112a-f can include memory elements for storing information to be used in achieving the graphical identifier generation functions, as outlined herein. Additionally, MCSs/MCC 144 and/or endpoints 112a-f may include a processor that can execute software or an algorithm to perform the graphical identifier generation controls, as discussed in this Specification. These devices may further keep information in any suitable memory element (random access memory (RAM), ROM, EPROM, EEPROM, ASIC, etc.), software, hardware, or in any other suitable component, device, element, or object where appropriate and based on particular needs. Any possible memory items (e.g., database, table, cache, etc.) should be construed as being encompassed within the broad term 'memory element.' Similarly, any of the potential processing elements, modules, and machines described in this Specification should be construed as being encompassed within the broad term 'processor.'

Note that with the examples provided herein, interaction may be described in terms of two or three elements. However, this has been done for purposes of clarity and example only. In certain cases, it may be easier to describe one or more of the functionalities of a given set of flows by only referencing a limited number of network elements. It should be appreciated that communication system 100 (and its teachings) are readily scalable and can accommodate a large number of rooms and sites, as well as more complicated/sophisticated arrangements and configurations. Accordingly, the examples provided herein should not limit the scope or inhibit the broad teachings of communication system 100 as potentially applied to a myriad of other architectures. Additionally, although described with reference to particular scenarios where MCSs/MCC 144 resides in a particular physical location, MCSs/MCC 144 can reside in any location, provided it has some connectivity to a suitable network.

The terms "virtual meeting" and "online meeting" are used interchangeably throughout the present disclosure. Both terms relate to the broad concept of transmitting and receiving meeting related data between different endpoints that may, e.g., be remote from one another.

It is also important to note that the steps discussed with reference to FIGS. 1-10 illustrate only some of the possible scenarios that may be executed by, or within, communication system 100. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 100 in that any suitable arrangements, chronologies, configurations, and timing mechanisms may be provided without departing from the teachings of the present disclosure.

Although the present disclosure has been described in detail with reference to particular embodiments, it should be understood that various other changes, substitutions, and alterations may be made hereto without departing from the spirit and scope of the present disclosure. For example, although some portions of the present disclosure may have been described as operating in virtual conferencing environments or arrangements such as WEBEX and/or MEETINGPLACE, the present disclosure may be used in any virtual environment that could benefit from such technology. For example, in certain instances, computers that are coupled to each other in some fashion can utilize the teachings of the present disclosure (e.g., even though participants would be in a face-to-face arrangement). The paradigm disclosed herein could still be respected by those meeting participants: even when they are physically co-located. Virtually any configuration that seeks to intelligently manage identifiers and/or graphical identifiers could enjoy the benefits of the present disclosure. Numerous other changes, substitutions, variations, alterations, and modifications may be ascertained to one skilled in the art and it is intended that the present disclosure encompass all such changes, substitutions, variations, alterations, and modifications as falling within the scope of the appended claims.

The following examples pertain to some embodiments of the disclosure.

Example 1 is a method comprising: establishing, by one or more servers, a communication session that provides an endpoint with access to at least one communication data stream, wherein the at least one communication data stream involves a plurality of profiles; generating a plurality of graphical identifiers corresponding to the plurality of profiles, wherein each of the plurality of graphical identifiers has at least one visual effect that is based on a determination of whether the corresponding endpoint is presently connected to another communication session with the one or more servers, and wherein each of the plurality of graphical identifiers has at least one additional visual effect that is based on an elapsed time since the corresponding endpoint performed the action related to the another communication session; and transmitting the plurality of graphical identifiers to the corresponding endpoint of at least one of the plurality of profiles.

In Example 2, the subject matter of Example 1 can optionally include for each of the plurality of profiles: determining whether a corresponding endpoint is presently connected to another communication session with the one or more servers, and determining an elapsed time since the corresponding endpoint performed an action related to the another communication session.

In Example 3, the subject matter of Example 1 or 2 can optionally include: receiving a request to initiate, within the communication data stream, a video call; determining whether to initiate the video call based on the elapsed time since the corresponding endpoint performed an action related to the another communication session for each of the plurality of profiles; and generating a graphical user interface window that includes text that identifies a result of the determination of whether to initiate the video call, wherein the graphical output comprises a first input option to initiate the video call and a second option to cancel the video call.

In Example 4, the subject matter of any of Examples 1-3 can optionally include: initiating, within the communication data stream, a video call based on a request generated by the endpoint; for each of the plurality of profiles: determining whether the corresponding endpoint is connected to the video call, wherein each of the plurality of graphical identifiers has at least one further visual effect that is based on the determination of whether the corresponding endpoint is connected to the video call; and transmitting the plurality of graphical identifiers to the corresponding endpoint of at least one of the plurality of profiles, wherein the corresponding endpoint of the at least one of the plurality of profiles is connected to the another communication session and is not connected to the video call.

In Example 5, the subject matter of any of Examples 1-4 can optionally include the each of the plurality of graphical identifiers having at least one further visual effect that is based on the determination of whether the corresponding endpoint is connected to the video call comprising: generating graphical identifiers that correspond to endpoints that are connected to the video call with a first visual effect, and generating the graphical identifiers that correspond to other endpoints that are not connected to the video call with a second visual effect.

In Example 6, the subject matter of any of Examples 1-5 can optionally include the determining whether the corresponding endpoint is presently connected to the another communication session with the one or more servers comprising: determining whether the corresponding endpoint is executing a graphical user interface application associated with the another communication session; when it is determined that the corresponding endpoint is executing the graphical user interface application associated with the another communication session, determining that the corresponding endpoint is presently connected to the another communication session with the one or more servers; and when it is determined that the corresponding endpoint is not executing the graphical user interface application associated with the another communication session, determining that the corresponding endpoint is not presently connected to the another communication session with the one or more servers.

In Example 7, the subject matter of any of Examples 1-6 can optionally include the generating the plurality of graphical identifiers corresponding to the plurality of profiles comprising for each of the plurality of profiles: determining whether the corresponding endpoint is connected to the video call, when it is determined that the corresponding endpoint is connected to the video call, receiving a video stream associated from the corresponding endpoint, wherein the video stream is utilized as a graphical identifier, when it is determined that the corresponding endpoint is connected to the video call, receiving a still image associated with a corresponding one of the plurality of profiles that are not connected to the video call, wherein the still image is utilized as a graphical identifier.

In Example 8, the subject matter of any of Examples 1-7 can optionally include each of the plurality of graphical identifiers having at least one further visual effect that is based on the determination of whether the corresponding endpoint is connected to the video call comprises: grouping, from the plurality of graphical identifiers, graphical identifiers that correspond to endpoints that are connected to the video call in a first portion of a graphical user interface associated with the communication session; grouping, from the plurality of graphical identifiers, graphical identifiers that correspond to endpoints that are not connected to the video call in a second portion of the graphical user interface associated with the communication session; and generating a visual delineation between the first portion and the second portion.

In Example 9, the subject matter of any of Examples 1-8 can optionally include detecting, from the corresponding endpoint of at least one of the plurality of profiles, a change in connectivity to the another communication session; and updating a graphical identifier in the plurality of graphical identifiers that corresponds to the at least one of the plurality of profiles, wherein the updating is based on the change in connectivity to the another communication session.

In Example 10, the subject matter of any of Examples 1-9 can optionally include the communication data stream is a data stream comprising asynchronous messages.

Example 11 is a server comprising: a memory element storing electronic code; and a graphical processing module coupled to the memory element and operable to execute the electronic code, wherein the graphical processing module, when executing the electronic code, performs operations comprising: establishing a communication session that provides an endpoint with access to at least one communication data stream, wherein the at least one communication data stream involves a plurality of profiles; generating a plurality of graphical identifiers corresponding to the plurality of profiles, wherein each of the plurality of graphical identifiers has at least one visual effect that is based on a determination of whether the corresponding endpoint is presently connected to another communication session with the server, and wherein each of the plurality of graphical identifiers has at least one additional visual effect that is based on an elapsed time since the corresponding endpoint performed the action related to the another communication session; and transmitting the plurality of graphical identifiers to the corresponding endpoint of at least one of the plurality of profiles.

In Example 12, the subject matter of Example 11 can optionally include for each of the plurality of profiles: determining whether a corresponding endpoint is presently connected to another communication session with the server, and determining an elapsed time since the corresponding endpoint performed an action related to the another communication session.

In Example 13, the subject matter of Example 11 or 12 can optionally include: receiving a request to initiate, within the communication data stream, a video call; determining whether to initiate the video call based on the elapsed time since the corresponding endpoint performed an action related to the another communication session for each of the plurality of profiles; and generating a graphical user interface window that includes text that identifies a result of the determination of whether to initiate the video call, wherein the graphical output comprises a first input option to initiate the video call and a second option to cancel the video call.

In Example 14, the subject matter of any of Examples 11-13 can optionally include: initiating, within the communication data stream, a video call based on a request generated by the endpoint; for each of the plurality of profiles: determining whether the corresponding endpoint is connected to the video call, wherein each of the plurality of graphical identifiers has at least one further visual effect that is based on the determination of whether the corresponding endpoint is connected to the video call; and transmitting the plurality of graphical identifiers to the corresponding endpoint of at least one of the plurality of profiles, wherein the corresponding endpoint of the at least one of the plurality of profiles is connected to the another communication session and is not connected to the video call.

In Example 15, the subject matter of any of Examples 11-14 can optionally include the each of the plurality of graphical identifiers having at least one further visual effect that is based on the determination of whether the corresponding endpoint is connected to the video call comprising: generating graphical identifiers that correspond to endpoints that are connected to the video call with a first visual effect, and generating the graphical identifiers that correspond to other endpoints that are not connected to the video call with a second visual effect.

In Example 16, the subject matter of any of Examples 11-15 can optionally include the determining whether the corresponding endpoint is presently connected to the another communication session with the server comprising: determining whether the corresponding endpoint is executing a graphical user interface application associated with the another communication session; when it is determined that the corresponding endpoint is executing the graphical user interface application associated with the another communication session, determining that the corresponding endpoint is presently connected to the another communication session with the server; and when it is determined that the corresponding endpoint is not executing the graphical user interface application associated with the another communication session, determining that the corresponding endpoint is not presently connected to the another communication session with the server.

In Example 17, the subject matter of any of Examples 11-16 can optionally include the generating the plurality of graphical identifiers corresponding to the plurality of profiles comprising for each of the plurality of profiles: determining whether the corresponding endpoint is connected to the video call, when it is determined that the corresponding endpoint is connected to the video call, receiving a video stream associated from the corresponding endpoint, wherein the video stream is utilized as a graphical identifier, when it is determined that the corresponding endpoint is connected to the video call, receiving a still image associated with a corresponding one of the plurality of profiles that are not connected to the video call, wherein the still image is utilized as a graphical identifier.

In Example 18, the subject matter of any of Examples 11-17 can optionally include each of the plurality of graphical identifiers having at least one further visual effect that is based on the determination of whether the corresponding endpoint is connected to the video call comprises: grouping, from the plurality of graphical identifiers, graphical identifiers that correspond to endpoints that are connected to the video call in a first portion of a graphical user interface associated with the communication session; grouping, from the plurality of graphical identifiers, graphical identifiers that correspond to endpoints that are not connected to the video call in a second portion of the graphical user interface associated with the communication session; and generating a visual delineation between the first portion and the second portion.

In Example 19, the subject matter of any of Examples 11-18 can optionally include detecting, from the corresponding endpoint of at least one of the plurality of profiles, a change in connectivity to the another communication session; and updating a graphical identifier in the plurality of graphical identifiers that corresponds to the at least one of the plurality of profiles, wherein the updating is based on the change in connectivity to the another communication session.

In Example 20, the subject matter of any of Examples 11-19 can optionally include the communication data stream is a data stream comprising asynchronous messages.

Example 21 is one or more non-transitory media that includes code for execution and when executed by one or more processors performs operations comprising: establishing a communication session that provides an endpoint with access to at least one communication data stream, wherein the at least one communication data stream involves a plurality of profiles; generating a plurality of graphical identifiers corresponding to the plurality of profiles, wherein each of the plurality of graphical identifiers has at least one visual effect that is based on a determination of whether the corresponding endpoint is presently connected to another communication session with one or more servers, and wherein each of the plurality of graphical identifiers has at least one additional visual effect that is based on an elapsed time since the corresponding endpoint performed the action related to the another communication session; and transmitting the plurality of graphical identifiers to the corresponding endpoint of at least one of the plurality of profiles.

In Example 22, the subject matter of Example 21 can optionally include for each of the plurality of profiles: determining whether a corresponding endpoint is presently connected to another communication session with the one or more servers, and determining an elapsed time since the corresponding endpoint performed an action related to the another communication session.

In Example 23, the subject matter of Example 21 or 22 can optionally include: receiving a request to initiate, within the communication data stream, a video call; determining whether to initiate the video call based on the elapsed time since the corresponding endpoint performed an action related to the another communication session for each of the plurality of profiles; and generating a graphical user interface window that includes text that identifies a result of the determination of whether to initiate the video call, wherein the graphical output comprises a first input option to initiate the video call and a second option to cancel the video call.

In Example 24, the subject matter of any of Examples 21-23 can optionally include: initiating, within the communication data stream, a video call based on a request generated by the endpoint; for each of the plurality of profiles: determining whether the corresponding endpoint is connected to the video call, wherein each of the plurality of graphical identifiers has at least one further visual effect that is based on the determination of whether the corresponding endpoint is connected to the video call; and transmitting the plurality of graphical identifiers to the corresponding endpoint of at least one of the plurality of profiles, wherein the corresponding endpoint of the at least one of the plurality of profiles is connected to the another communication session and is not connected to the video call.

In Example 25, the subject matter of any of Examples 21-24 can optionally include the each of the plurality of graphical identifiers having at least one further visual effect that is based on the determination of whether the corresponding endpoint is connected to the video call comprising: generating graphical identifiers that correspond to endpoints that are connected to the video call with a first visual effect, and generating the graphical identifiers that correspond to other endpoints that are not connected to the video call with a second visual effect.

In Example 26, the subject matter of any of Examples 21-25 can optionally include the determining whether the corresponding endpoint is presently connected to the another communication session with the one or more servers comprising: determining whether the corresponding endpoint is executing a graphical user interface application associated with the another communication session; when it is determined that the corresponding endpoint is executing the graphical user interface application associated with the another communication session, determining that the corresponding endpoint is presently connected to the another communication session with the one or more servers; and when it is determined that the corresponding endpoint is not executing the graphical user interface application associated with the another communication session, determining that the corresponding endpoint is not presently connected to the another communication session with the one or more servers.

In Example 27, the subject matter of any of Examples 21-26 can optionally include the generating the plurality of graphical identifiers corresponding to the plurality of profiles comprising for each of the plurality of profiles: determining whether the corresponding endpoint is connected to the video call, when it is determined that the corresponding endpoint is connected to the video call, receiving a video stream associated from the corresponding endpoint, wherein the video stream is utilized as a graphical identifier, when it is determined that the corresponding endpoint is connected to the video call, receiving a still image associated with a corresponding one of the plurality of profiles that are not connected to the video call, wherein the still image is utilized as a graphical identifier.

In Example 28, the subject matter of any of Examples 21-27 can optionally include each of the plurality of graphical identifiers having at least one further visual effect that is based on the determination of whether the corresponding endpoint is connected to the video call comprises: grouping, from the plurality of graphical identifiers, graphical identifiers that correspond to endpoints that are connected to the video call in a first portion of a graphical user interface associated with the communication session; grouping, from the plurality of graphical identifiers, graphical identifiers that correspond to endpoints that are not connected to the video call in a second portion of the graphical user interface associated with the communication session; and generating a visual delineation between the first portion and the second portion.

In Example 29, the subject matter of any of Examples 21-28 can optionally include detecting, from the corresponding endpoint of at least one of the plurality of profiles, a change in connectivity to the another communication session; and updating a graphical identifier in the plurality of graphical identifiers that corresponds to the at least one of the plurality of profiles, wherein the updating is based on the change in connectivity to the another communication session.

In Example 30, the subject matter of any of Examples 21-29 can optionally include the communication data stream is a data stream comprising asynchronous messages.

Example 31 is a method comprising: establishing a communication session comprising a communication data stream between a plurality of endpoints; initiating, within the communication session, a video call based on a request received from one or more of the plurality of endpoints; generating a plurality of graphical identifiers corresponding to the plurality of endpoints, wherein graphical identifiers that correspond to endpoints that are connected to the video call are graphically distinguished from graphical identifiers that correspond to endpoints that are not connected to the video call; and transmitting the plurality of graphical identifiers to at least one of the plurality of endpoints that has joined the chat data stream and has not joined the video call.

In Example 32, the subject matter of Example 31 can optionally include the graphical identifiers that correspond to endpoints that are connected to the video call being graphically distinguished from graphical identifiers that correspond to endpoints that are not connected to the video call comprising: generating the graphical identifiers that correspond to endpoints that are connected to the video call with a first visual effect, and generating the graphical identifiers that correspond to endpoints that are not connected to the video call with a second visual effect.

Example 33 is a server comprising: a memory element storing electronic code; and a graphical processing module coupled to the memory element and operable to execute the electronic code, wherein the graphical processing module, when executing the electronic code, performs operations comprising: establishing a communication session comprising a communication data stream between a plurality of endpoints; initiating, within the communication session, a video call based on a request received from one or more of the plurality of endpoints; generating a plurality of graphical identifiers corresponding to the plurality of endpoints, wherein graphical identifiers that correspond to endpoints that are connected to the video call are graphically distinguished from graphical identifiers that correspond to endpoints that are not connected to the video call; and transmitting the plurality of graphical identifiers to at least one of the plurality of endpoints that has joined the chat data stream and has not joined the video call.

In Example 34, the subject matter of Example 33 can optionally include the graphical identifiers that correspond to endpoints that are connected to the video call being graphically distinguished from graphical identifiers that correspond to endpoints that are not connected to the video call comprising: generating the graphical identifiers that correspond to endpoints that are connected to the video call with a first visual effect, and generating the graphical identifiers that correspond to endpoints that are not connected to the video call with a second visual effect.

Example 35 is one or more non-transitory media that includes code for execution and when executed by one or more processors performs operations comprising: establishing a communication session comprising a communication data stream between a plurality of endpoints; initiating, within the communication session, a video call based on a request received from one or more of the plurality of endpoints; generating a plurality of graphical identifiers corresponding to the plurality of endpoints, wherein graphical identifiers that correspond to endpoints that are connected to the video call are graphically distinguished from graphical identifiers that correspond to endpoints that are not connected to the video call; and transmitting the plurality of graphical identifiers to at least one of the plurality of endpoints that has joined the chat data stream and has not joined the video call.

In Example 36, the subject matter of Example 35 can optionally include the graphical identifiers that correspond to endpoints that are connected to the video call being graphically distinguished from graphical identifiers that correspond to endpoints that are not connected to the video call comprising: generating the graphical identifiers that correspond to endpoints that are connected to the video call with a first visual effect, and generating the graphical identifiers that correspond to endpoints that are not connected to the video call with a second visual effect.

What is claimed is:

1. A method comprising:
    establishing, by one or more servers, a communication session that provides an endpoint with access to at least one communication data stream, wherein the at least one communication data stream involves a plurality of profiles;
    enabling the endpoint to identify which of the plurality of profiles is available to join a video call by:
        prior to initiating the video call, generating a plurality of graphical identifiers corresponding to the plurality of profiles, wherein each of the plurality of graphical identifiers has at least one visual effect that is based on a determination of whether a corresponding endpoint is presently connected to another communication session with the one or more servers, and wherein each of the plurality of graphical identifiers has at least one additional visual effect that is based on an elapsed time since the corresponding endpoint performed the action related to the another communication session; and
        transmitting the plurality of graphical identifiers to the endpoint, wherein the endpoint is configured to identify which of the plurality of profiles is available to join the video call based on the at least one visual effect and the at least one additional visual effect;
    receiving a request to initiate, within the communication data stream, the video call;
    determining whether to initiate the video call based on the elapsed time since the corresponding endpoint performed an action related to the another communication session for each of the plurality of profiles; and
    generating a graphical user interface window that includes text that identifies a result of the determination of whether to initiate the video call, wherein the graphical output comprises a first input option to initiate the video call and a second option to cancel the video call.

2. The method of claim 1, further comprising:
    for each of the plurality of profiles:
        determining whether the corresponding endpoint is presently connected to another communication session with the one or more servers, and
        determining the elapsed time since the corresponding endpoint performed an action related to the another communication session.

3. The method of claim 2, further comprising:
    initiating, within the communication data stream, the video call based on a request generated by the endpoint;
    for each of the plurality of profiles: determining whether the corresponding endpoint is connected to the video call, wherein each of the plurality of graphical identifiers has at least one further visual effect that is based on a determination of whether the corresponding endpoint is connected to the video call; and
    transmitting the plurality of graphical identifiers to the corresponding endpoint of at least one of the plurality of profiles, wherein the corresponding endpoint of the at least one of the plurality of profiles is connected to the another communication session and is not connected to the video call.

4. The method of claim 3, wherein the generating the plurality of graphical identifiers corresponding to the plurality of profiles comprises:
    for each of the plurality of profiles:
        determining whether the corresponding endpoint is connected to the video call,
        when it is determined that the corresponding endpoint is connected to the video call, receiving a video stream associated from the corresponding endpoint, wherein the video stream is utilized as a graphical identifier, and
        when it is determined that the corresponding endpoint is connected to the video call, receiving a still image associated with a corresponding one of the plurality of profiles that are not connected to the video call, wherein the still image is utilized as a graphical identifier.

5. The method of claim 3, wherein each of the plurality of graphical identifiers having at least one further visual effect that is based on the determination of whether the corresponding endpoint is connected to the video call comprises:
    grouping, from the plurality of graphical identifiers, graphical identifiers that correspond to endpoints that are connected to the video call in a first portion of a graphical user interface associated with the communication session;
    grouping, from the plurality of graphical identifiers, graphical identifiers that correspond to endpoints that are not connected to the video call in a second portion of the graphical user interface associated with the communication session; and
    generating a visual delineation between the first portion and the second portion.

6. The method of claim 1, further comprising:
    detecting, from the corresponding endpoint of at least one of the plurality of profiles, a change in connectivity to the another communication session; and
    updating a graphical identifier in the plurality of graphical identifiers that corresponds to the at least one of the plurality of profiles, wherein the updating is based on the change in connectivity to the another communication session.

7. A server comprising:
a memory element storing electronic code; and
a graphical processing module coupled to the memory element and operable to execute the electronic code, wherein the graphical processing module, when executing the electronic code, performs operations comprising:
establishing a communication session that provides an endpoint with access to at least one communication data stream, wherein the at least one communication data stream involves a plurality of profiles;
enabling the endpoint to identify which of the plurality of profiles is available to join a video call by:
prior to initiating the video call, generating a plurality of graphical identifiers corresponding to the plurality of profiles, wherein each of the plurality of graphical identifiers has at least one visual effect that is based on a determination of whether a corresponding endpoint is presently connected to another communication session with the server, and wherein each of the plurality of graphical identifiers has at least one additional visual effect that is based on an elapsed time since the corresponding endpoint performed the action related to the another communication session; and
transmitting the plurality of graphical identifiers to the endpoint, wherein the endpoint is configured to identify which of the plurality of profiles is available to join the video call based on the at least one visual effect and the at least one additional visual effect;
receiving a request to initiate, within the communication data stream, the video call;
determining whether to initiate the video call based on the elapsed time since the corresponding endpoint performed an action related to the another communication session for each of the plurality of profiles; and
generating a graphical user interface window that includes text that identifies a result of the determination of whether to initiate the video call, wherein the graphical output comprises a first input option to initiate the video call and a second option to cancel the video call.

8. The server of claim 7, wherein the operations further comprise:
for each of the plurality of profiles:
determining whether the corresponding endpoint is presently connected to another communication session with the server, and
determining the elapsed time since the corresponding endpoint performed an action related to the another communication session.

9. The server of claim 8, wherein the operations further comprise:
initiating, within the communication data stream, the video call based on a request generated by the endpoint;
for each of the plurality of profiles: determining whether the corresponding endpoint is connected to the video call, wherein each of the plurality of graphical identifiers has at least one further visual effect that is based on a determination of whether the corresponding endpoint is connected to the video call; and
transmitting the plurality of graphical identifiers to the corresponding endpoint of at least one of the plurality of profiles, wherein the corresponding endpoint of the at least one of the plurality of profiles is connected to the another communication session and is not connected to the video call.

10. The server of claim 9, wherein the generating the plurality of graphical identifiers corresponding to the plurality of profiles comprises:
for each of the plurality of profiles:
determining whether the corresponding endpoint is connected to the video call,
when it is determined that the corresponding endpoint is connected to the video call, receiving a video stream associated from the corresponding endpoint, wherein the video stream is utilized as a graphical identifier, and
when it is determined that the corresponding endpoint is connected to the video call, receiving a still image associated with a corresponding one of the plurality of profiles that are not connected to the video call, wherein the still image is utilized as a graphical identifier.

11. The server of claim 9, wherein each of the plurality of graphical identifiers having at least one further visual effect that is based on the determination of whether the corresponding endpoint is connected to the video call comprises:
grouping, from the plurality of graphical identifiers, graphical identifiers that correspond to endpoints that are connected to the video call in a first portion of a graphical user interface associated with the communication session;
grouping, from the plurality of graphical identifiers, graphical identifiers that correspond to endpoints that are not connected to the video call in a second portion of the graphical user interface associated with the communication session; and
generating a visual delineation between the first portion and the second portion.

12. The server of claim 7, wherein the operations further comprise:
detecting, from the corresponding endpoint of at least one of the plurality of profiles, a change in connectivity to the another communication session; and
updating a graphical identifier in the plurality of graphical identifiers that corresponds to the at least one of the plurality of profiles, wherein the updating is based on the change in connectivity to the another communication session.

13. One or more non-transitory media that includes code for execution and when executed by one or more processors performs operations comprising:
establishing a communication session that provides an endpoint with access to at least one communication data stream, wherein the at least one communication data stream involves a plurality of profiles;
enabling the endpoint to identify which of the plurality of profiles is available to join a video call by:
prior to initiating the video call, generating a plurality of graphical identifiers corresponding to the plurality of profiles, wherein each of the plurality of graphical identifiers has at least one visual effect that is based on a determination of whether a corresponding endpoint is presently connected to another communication session with one or more servers, and wherein each of the plurality of graphical identifiers has at least one additional visual effect that is based on an elapsed time since the corresponding endpoint performed the action related to the another communication session; and transmitting the plurality of graphical identifiers to the endpoint, wherein the endpoint is configured to identify which of the plurality of profiles is available to join the video call based on the at least one visual effect and the at least one additional visual effect;

receiving a request to initiate, within the communication data stream, the video call;

determining whether to initiate the video call based on the elapsed time since the corresponding endpoint performed an action related to the another communication session for each of the plurality of profiles; and generating a graphical user interface window that includes text that identifies a result of the determination of whether to initiate the video call, wherein the graphical output comprises a first input option to initiate the video call and a second option to cancel the video call.

14. The one or more non-transitory media of claim 13, wherein the operations further comprise:

for each of the plurality of profiles:
determining whether the corresponding endpoint is presently connected to another communication session with the one or more servers, and determining the elapsed time since the corresponding endpoint performed an action related to the another communication session.

15. The one or more non-transitory media of claim 14, wherein the operations further comprise:

initiating, within the communication data stream, the video call based on a request generated by the endpoint;

for each of the plurality of profiles: determining whether the corresponding endpoint is connected to the video call, wherein each of the plurality of graphical identifiers has at least one further visual effect that is based on a determination of whether the corresponding endpoint is connected to the video call; and transmitting the plurality of graphical identifiers to the corresponding endpoint of at least one of the plurality of profiles, wherein the corresponding endpoint of the at least one of the plurality of profiles is connected to the another communication session and is not connected to the video call.

16. The one or more non-transitory media of claim 15, wherein the generating the plurality of graphical identifiers corresponding to the plurality of profiles comprises:

for each of the plurality of profiles:
determining whether the corresponding endpoint is connected to the video call, when it is determined that the corresponding endpoint is connected to the video call, receiving a video stream associated from the corresponding endpoint, wherein the video stream is utilized as a graphical identifier, and when it is determined that the corresponding endpoint is connected to the video call, receiving a still image associated with a corresponding one of the plurality of profiles that are not connected to the video call, wherein the still image is utilized as a graphical identifier.

17. The one or more non-transitory media of claim 15, wherein each of the plurality of graphical identifiers having at least one further visual effect that is based on the determination of whether the corresponding endpoint is connected to the video call comprises:

grouping, from the plurality of graphical identifiers, graphical identifiers that correspond to endpoints that are connected to the video call in a first portion of a graphical user interface associated with the communication session;

grouping, from the plurality of graphical identifiers, graphical identifiers that correspond to endpoints that are not connected to the video call in a second portion of the graphical user interface associated with the communication session; and generating a visual delineation between the first portion and the second portion.

18. The one or more non-transitory media of claim 13, wherein the operations further comprise:

detecting, from the corresponding endpoint of at least one of the plurality of profiles, a change in connectivity to the another communication session; and updating a graphical identifier in the plurality of graphical identifiers that corresponds to the at least one of the plurality of profiles, wherein the updating is based on the change in connectivity to the another communication session.

\* \* \* \* \*